(12) United States Patent
Sakaguchi et al.

(10) Patent No.: US 7,639,587 B2
(45) Date of Patent: Dec. 29, 2009

(54) OPTICAL INFORMATION RECORDING AND REPRODUCING APPARATUS AND OPTICAL INFORMATION RECORDING APPARATUS

(75) Inventors: Kiyofumi Sakaguchi, Kanagawa-ken (JP); Takeshi Ichikawa, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 506 days.

(21) Appl. No.: 11/563,395

(22) Filed: Nov. 27, 2006

(65) Prior Publication Data
US 2007/0147215 A1   Jun. 28, 2007

(30) Foreign Application Priority Data
Nov. 29, 2005   (JP) ............................. 2005-344379

(51) Int. Cl.
*G11B 7/00* (2006.01)
(52) U.S. Cl. ..................................... 369/103
(58) Field of Classification Search ................. 369/103, 369/126, 44.23, 44.24, 112.01; 359/22, 30
See application file for complete search history.

(56) References Cited

U.S. PATENT DOCUMENTS

| | | | | |
|---|---|---|---|---|
| 5,949,558 A | * | 9/1999 | Psaltis et al. .................. | 359/22 |
| 6,281,993 B1 | * | 8/2001 | Bernal et al. .................. | 359/29 |
| 7,012,722 B2 | * | 3/2006 | Ogasawara ................... | 359/30 |
| 7,116,626 B1 | * | 10/2006 | Woods et al. ................ | 369/103 |
| 2007/0146847 A1 | | 6/2007 | Sakaguchi et al. ............ | 359/29 |

OTHER PUBLICATIONS

Hirogome, Hideyoshi, et al. "Holographic Medica Close to Takeoff, Realize 200 GB in 2006," Nikkei Electronics, No. 891, Jan. 17, 2005, pp. 105-114, with English translation.

* cited by examiner

*Primary Examiner*—Nabil Z Hindi
(74) *Attorney, Agent, or Firm*—Fitzpatrick, Cella, Harper & Scinto

(57) ABSTRACT

An optical information recording and reproducing apparatus for recording information on a recording medium by forming interference fringes generated by interference between an information beam and a reference beam on the recording medium, and reproducing the information by irradiating the recording medium with the reference beam, in which the interference fringes are formed. The apparatus includes a spatial light modulator for spatially modulating at least a portion of the light beam emitted from a light source into the information beam, a light sensing device that reads the information beam extracted from the recording medium by the reference beam irradiated on the recording medium, a shift amount detector that detects a shift of an irradiating position of the light beam entering the spatial light modulator, and a device that corrects a positional shift between a position of an area for modulating the information beam and a position of the light beam in the spatial light modulator, based on a positional shift amount detected by the shift amount detector.

26 Claims, 15 Drawing Sheets

OPTICAL INFORMATION RECORDING AND REPRODUCING APPARATUS AND OPTICAL INFORMATION RECORDING APPARATUS

This application claims the benefit of Japanese Patent Application No. 2005-344379, filed Nov. 29, 2005, which is hereby incorporated by reference herein in its entirety.

BACKGROUND OF THE INVENTION

1. Field of the Invention

The present invention relates to an optical information recording and reproducing apparatus, and an optical information recording apparatus, using a hologram capable of recording information with a higher density and a larger capacity by recording optical interference fringes on a recording medium.

2. Description of the Related Art

These days, the world has entered an age of multimedia, and the necessity for a recording apparatus that performs recording on a recording medium and a recording and reproducing apparatus that performs recording and reproducing onto and from a recording medium has increased in the level of importance, and the recording density has been raised year by year. In an optical information recording medium, also, progress has been made from a CD (compact disk) through a DVD (Digital versatile disk) to a BlueRay (Blue ray) disk. Responding to the progress made in the optical information recording media, in the optical information recording apparatus, and the optical information recording and reproducing apparatus, also using the disk, the recording density has been raised by shortening the wavelength of the light to be used. In recent years, a new recording system referred to as a holographic memory has been proposed. The holographic memory performs the recording of information by forming a hologram corresponding to the information to be recorded inside the recording medium. Because of the characteristics using the hologram, a multiplex recording is made possible, and, even if adjacent holograms have an overlapped portion with each other, information can be reproduced independently from these holograms. Consequently, the holographic memory can achieve a higher recording density, which has not been obtainable in the conventional optical information recording medium.

On the holographic memory, for example, a description is made in Hideyoshi HORIGOME, et al., [Holographic medium near at taking off the ground, 200 Gbyte expected to be realized in 2006], Nikkei Electronics, Vol. No. 891, pages 105 to 114, Jan. 17, 2005. In this article, the recording and reproducing apparatus by holographic memory using a two-dimensional spatial light modulator and a light sensing device is disclosed. Also, in this article, a description is made of an optical system of the holographic memory system (optical information recording and reproducing apparatus) of a coaxial type, referred to as a collinear system.

In the final analysis, in this optical information recording and reproducing apparatus, the information to be recorded is developed into second-dimensional digital pattern information, and by this second-dimensional optical pattern information, an information beam is modulated. By this processing, the information beam is generated, in which the recording information becomes two-dimensional spatial beam intensity distribution image information. By allowing the information beam and the reference beam to interfere, the interference fringes are recorded on the recording medium. At the reproducing time, two-dimensional digital pattern information is extracted and decoded from the beam intensity distribution image information reproduced by irradiating the reference beam. By this digital processing, it is possible to inhibit the lowering of the reproducing error rate due to deterioration of an S/N ratio, and moreover, by coding binarized data and performing error correction, it is possible to reproduce the recording information highly faithfully.

In the holographic memory system of the above-described collinear system, since the information beam and the reference beam have a coaxial optical arrangement having no angle, recording and reproducing can be performed by using one piece of an object lens. Hence, as compared to a two-axis two light beam interference system allowing the information beam and the reference beam to irradiate the recording medium from a different optical path, there is the advantage that the optical system becomes simple. Further, because of the configuration of the recording medium having a reflection film, there is the advantage that the optical system can be arranged at one surface side of the disk-shaped recording medium.

SUMMARY OF THE INVENTION

Now, in the above-described conventional optical information recording and reproducing apparatus, due to shape distortion, and the like, by temperatures of members such as a light source, a lens, a beam splitter, and the like, there is often a shift that occurs in the positional relationship between the two-dimensional spatial light modulator and the light beam incident on the spatial light modulator from a laser light source. Further, in the optical information recording and reproducing apparatus of this type, while it is assumed that the laser light source is exchanged, even due to insufficient reproducibility of the physical position at the time of such an exchange of the light source, a shift may occur in the positional relationship between the spatial light modulator and the light beam. When such a shift occurs, an adequate beam quantity necessary to form the interference fringes is not assured, and a portion of the interference fringes original to be formed is lost, in the event that the interference fringes (volume hologram) is formed in the recording medium by the reference beam and the information beam. As a result, an erroneous hologram pattern is recorded in the recording medium, and, when the information is reproduced from the recording medium, an erroneous reproduced light beam is detected. An erroneous detection of the reproduced light beam directly leads to the generation of a reproducing error.

Hence, an object of the present invention is to provide an optical information recording and reproducing apparatus capable of correcting a shift or compensating for the shift, even when the shift occurs in the positional relationship between the light beam incident on the spatial light modulator and the spatial light modulator.

The optical information recording and reproducing apparatus of the present invention records information on a recording medium by forming interference fringes generated by interference between an information beam and a reference beam on the recording medium, and, at the same time, performs the reproducing of the information by irradiating the reference beam on the recording medium formed with the interference fringes, and comprises a spatial light modulator for spatially modulating at least a portion of the light beam emitted from a light source and making it into the information beam, a light sensing device that reads an information beam extracted from the recording medium by the reference beam irradiated on the recording medium, a shift amount detector that detects a shift of the irradiating position of the light beam entering the spatial light modulator, and means that corrects a positional shift between a position of the information beam modulating area and the light beam in the spatial light modulator, based on the positional shift amount detected by the shift amount detector.

The optical information recording apparatus of the present invention records the information in the recording medium by forming interference fringes generated by the interference between the information beam and the reference beam on the recording medium, and comprises a spatial light modulator for spatially modulating at least a portion of the light beam emitted from the light source and making it into the information beam, an optical system for allowing the reference beam and the information beam to interfere at a predetermined depth of the recording medium, and a shift amount detector that detects a shift of the irradiating position of the light beam incident on the spatial light modulator based on the positional shift amount detected by the shift amount detector.

In the present invention, correcting means, for example, corrects the detected positional shift amount by feedback. Further, as the spatial light modulator, it is preferable to use a modulator having a plurality of pixels and a configuration capable of allowing the effective pixel to function as a pixel for a reference beam and a pixel for an information beam. When such a spatial light modulator is used, the area of the effective pixel of the spatial light modulator is divided into the area for the reference beam and the area for the information beam, according to the position based on the detected positional shift amount, so that the correction of the positional shift can be performed.

As a specific configuration for correcting the positional shift, there is such a configuration cited in which, when a shift register to write a signal is provided for each pixel in the effective pixel area, a start position in the shift register is corrected, so that the positional shift is corrected, or a configuration provided with means to allow a position of the spatial light modulator to mechanically move toward the incident beam.

In the present invention, it is preferable to use a modulator/light sensing device, in which the spatial light modulator and the light sensing device are integrally formed on the same substrate. In such a modulator/light sensing device, as the positional relationship between the spatial light modulator and the light sensing device, there are those which arrange the spatial light modulator and the light sensing device on the substrate in a longitudinal direction and in a horizontal direction. In the case of arranging in the longitudinal direction, the spatial light modulator and the light sensing device are laminated, such that the spatial light modulator is arranged at the light source side, and a pixel pitch in the spatial light modulator and a pixel pitch in the light sensing device are matched, so that the pixel in the spatial light modulator and the corresponding pixel in the light sensing device are arranged along an optical axis of the light incident from the light source, and at least a portion of the light incident on the spatial light modulator transmits toward the light sensing device. In contrast to this, in the case of arranging in the horizontal direction, the spatial light modulator and the light sensing device are mutually arranged close to each other, so that the pixel in the spatial light modulator and the corresponding pixel in the light sensing device are not overlapped along the optical axis of the light incident from the light source.

In the present invention, as the spatial light modulator, it is preferable to use a modulator having a plurality of modulators, in which intensity of the reflection beam changes according to a modulating signal. Such a modulator is an element comprising, for example, a reflection electrode to reflect the light from the light source and a semi-transparent film arranged on the light source side to the reflection electrode via a space, and showing a semi-transparency for the light from the light source, wherein the reflectance of the light from the light source changes through the control of a gap between the reflection electrode and the semi-transparent film. Alternatively, the modulator is a reflection type liquid crystal element.

That is, the present invention moves a position of the area modulated as the information beam and the reference beam in the spatial light modulator in conformity to the light beam irradiated on the spatial light modulator. As a result, the generation of a recording error and a reproducing error due to a shift of the light beam from the light source can be inhibited.

According to the present invention, even when the optical axis of the incident light is shifted or fluctuated for the spatial light modulator, a shift amount is detected by the element detecting such a shift and fluctuation, and can be corrected according to the detection positional shift amount, and therefore, a relative positional relationship between the incident light in the spatial light modulator and the display area of the modulating signal can be always maintained similarly, as the initial setting.

In the optical information recording and reproducing apparatus of the present invention, in order to detect a shift amount of the light beam, the element configured by semiconductor chips is increased by one just by the shift amount detector typically configured as an image sensor. However, it is also possible to use the light sensing device for hologram reproduction as a shift amount detector, and, in that case, as compared to the conventional element, the number of semiconductor chips does not increase. Particularly, by integrally providing the spatial light modulator and the light sensing device on the same substrate, the number of such semiconductor chips can be reduced to one piece from two pieces. Since the spatial light modulator and the light sensing device, such as a CMOS sensor, are almost the same in each step of the semiconductor process for manufacture these elements, there is no increase in the number of steps, and it is possible to incorporate the functions of these elements all at once. As a result, despite the fact that the functions of correcting the positional shift of the light beam is added, the optical system is made much simpler as the optical information recording and reproducing apparatus, thereby making it possible to make a setting space much smaller. Further, since the write to the recording medium and the read from the recording medium can be performed approximately on the same axis, the positional shift between the optical system for the write and the optical system for the read is substantially eliminated, so that no adjustment of the optical shift between both systems is required.

Further features of the present invention will become apparent from the following description of exemplary embodiments, with reference to the attached drawings.

DESCRIPTION OF THE EMBODIMENTS

Next, preferred embodiments of the present invention will be described with reference to the drawings.

Figure 25:
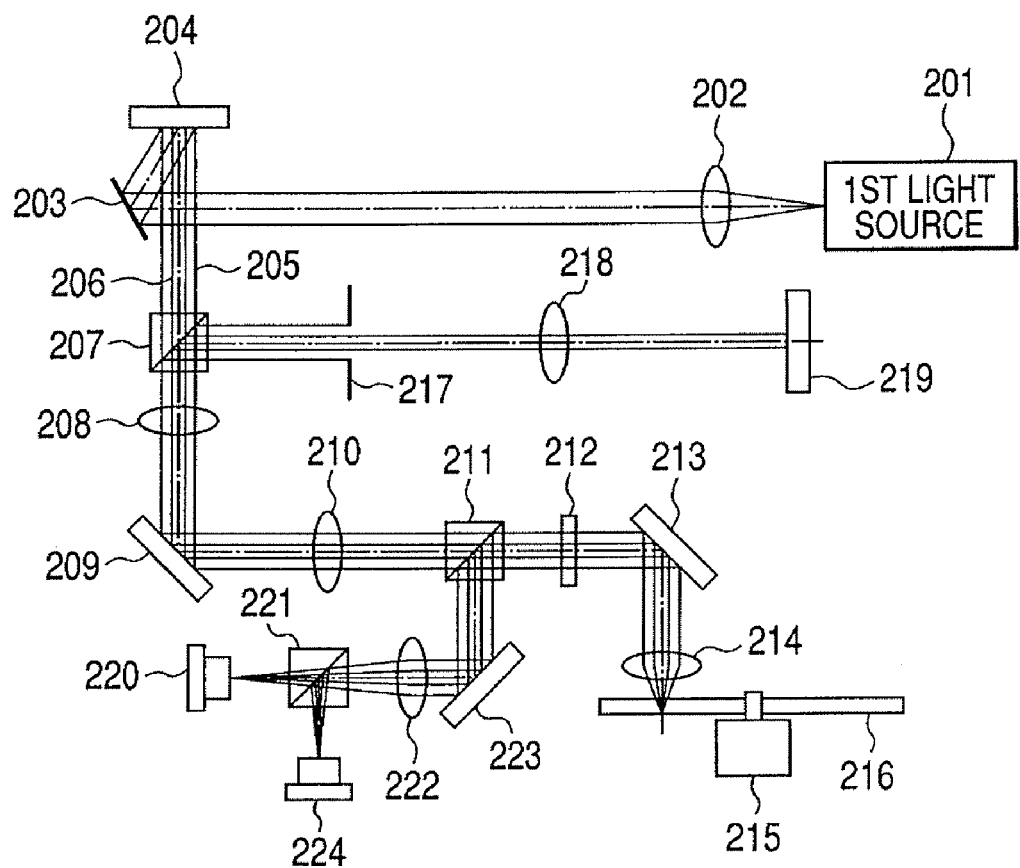
FIG. 25 is a view showing the outline of a conventional optical information recording and reproducing apparatus using a holographic memory.

First, by referring to FIG. 25, a recording and reproducing apparatus by a holographic memory using a two-dimensional spatial light modulator (SLM) and a light sensing device consisting of a CMOS sensor, and the like, will be described. In FIG. 25, an optical system of a holographic memory system (optical information recording and reproducing apparatus) of a coaxial type, referred to as a collinear system, will be described.

This optical information recording and reproducing apparatus performs, for example, the recording and reproducing of information in a disk-shaped hologram recording medium 216. Specifically, a signal beam modulated by information and a reference beam not modulated by the information are simultaneously irradiated on the recording medium 216, and are allowed to interfere with each other, so that a volume hologram is formed inside the recording medium 216, and information is recorded. Further, a weak reference beam is irradiated on the recording medium 216, so that a reproduced image of the volume hologram is obtained, and the information is reproduced. Incidentally, the volume hologram of the recording medium is a system, in which an interference fringe is written three-dimensionally by positively using a thickness direction of the recording medium. Also, diffraction efficiency is increased by increasing the thickness, and a recording capacity is increased by using a multiplex recording. The digital volume hologram is a hologram recording system, in which, while using the same recording system as the volume hologram, image information to be recorded is limited to a binarized digital pattern.

The illustrated optical system comprises a first light source 201 generating a laser beam used for recording and reproducing the information, a spatial light modulator (hereinafter abbreviated as SLM) 204 for modulating the signal beam, and a two-dimensional light sensing device 219 for detecting the reproduced beam.

[Recording]

First, a description will be made of a case in which the recording is performed on a disk-shaped recording medium 216 by using the above-described optical system.

The light beam emitted from the first light source 201, consisting of a green laser, and the like, is turned into a parallel light beam by a collimator 202, and passes through a mirror 203, and radiates on the spatial light modulator (SLM) 204. Shown in FIG. 25 is a DMD (Deformable Mirror Device), which is used as the SLM 204. Such an SLM 204 has a large number of light modulators (pixels) two-dimensionally arranged, and represents [0] and [1] per each pixel. In the SLM 204, the light reflected by the pixel representing the information on [1] is reflected in the direction of the recording medium 216, and the light reflected by the pixel representing the information on [0] is not reflected in the direction of the recording medium 216. In the SLM 204 used by the holographic memory system of a collinear system, its center portion is made into a portion to modulate an information beam 206, and a portion circularly surrounding that portion is made into a portion to modulate a reference beam 205.

Both of the information beam 206 and the reference beam 205 reflected by the pixel representing the information on [1] in the SLM 204 transmit a polarizing beam splitter (hereinafter abbreviated as PBS) 207 by P polarization. Then, passing through a first relay lens 208, a mirror 209, a second relay lens 210, and a dichroic beam splitter (hereinafter abbreviated as DBS) 211, both of the beams are oriented to the recording medium 216. The reference beam 205 and the information beam 206, both of which are converted into circularly polarized beams (for example, clockwise circularly polarized beams) by transmitting a quarter wavelength plate (hereinafter abbreviated as QWP) 212, after having passed through the DBS 211, are reflected by a mirror 213, and enter an object lens 214 having a focal length F. The pattern displayed on the SLM 204 forms an intermediate image short of the object lens 214 just by F, by the first and second relay lenses 208 and 210. As a result, a 4F optical system is configured, in which each of the pattern images (not shown) on the SLM 204, the object lens 214, and the recording medium 216 is arranged apart by a distance of F.

The disk-shaped recording medium 216 is rotatably held on a spindle motor 215. By the object lens 214, the reference beam 205 and the information beam 206 are converged on the recording medium 216, and form interference fringes by mutual interference. A high polymer material inside the recording medium 216 is recorded with interference fringe patterns at this recording time as a refractive index distribution, and, as a result, a digital volume hologram is formed. By the SLM 204, if the information beam 206 is modulated according to the information to be recorded, the recording medium 216 is formed with a digital volume hologram according to that information. Particularly, in the information beam area of the SLM 204, if the modulation is performed for each pixel according to the information to be recorded, the recording medium 216 is formed with the digital volume hologram having an information amount according to the number of such pixels. Incidentally, a reflection film is provided inside the recording medium 216.

The optical information recording and reproducing apparatus is provided with a second light source 220, consisting of a red laser, and the like, having no sensitivity for the recording medium 216, other than the first light source 201 that performs the recording and reproducing of hologrammed optical information. By using this second light source 220 with the reflection film of the recording medium 216 taken as a reference surface, it is possible to detect displacement of the recording medium 216 with a high degree of accuracy. Therefore, even if side-runout or decentering occurs in the recording medium 216, a recording spot can be allowed to dynamically follow the recording medium surface by using optical servo technology, and the interference fringe patterns can be recorded with a high degree of accuracy. Such tracking will be briefly described below.

A linear polarized light beam emitted from the second light source 220, consisting of the red laser, and the like, transmits a beam splitter (hereinafter abbreviated as BS) 211, and is made into a parallel light beam by a lens 222, and is reflected by a mirror 223 and the DBS 211, and is oriented to the recording medium 216. The light beam transmitting the QWP 212 and converted into a circularly polarized beam (for example, clockwise circularly polarized beam) is reflected by the mirror 213, and enters the object lens 214, and is converged on the reflection film of the recording medium 216 as a fine optical spot. The reflected light beam becomes a circularly polarized beam (for example, an anticlockwise circularly polarized beam) rotating in the opposite direction, and enters the object lens 214, again to be made into a parallel light beam, and is reflected by the mirror 213, and transmits the QWP 212, and is converted into a linear polarized light beam vertical to the polarized beam on the outward route. The light beam reflected by the DBS 211, similarly to the outward route, passes through the mirror 223 and the lens 222, and is reflected by the BS 221, and is guided to an optical detector 224. The optical detector 224 has a plurality of light receiving surfaces, and detects positional information on the reflected surface. Based on this detected result, the optical detector can perform the focusing and tracking of the object lens 214. Such focusing and tracking are the same as those performed in the conventionally well-known optical information recording and reproducing apparatus using CDs, DVDs, and the like.

[Reproducing]

Next, a description will be made of a case in which reproducing of the information recorded in the recording medium 216 is performed by using the above-described optical system. The light beam emitted from the first light source 201 irradiates the SLM 204 similar to the recording time. At the reproducing time, a portion that only modulates the reference beam 205 of the SLM 204 displays the information on [1], and all the portions that modulate the information beam 206 display the information on [0]. Consequently, the light only reflected by the pixel of the portion of the reference beam 205 is reflected in the direction of the recording medium 216, and the information beam 206 is not reflected in the direction of the recording medium 216.

The reference beam 205, similar to the recording time, becomes a circularly polarized beam (for example, a clockwise circularly polarized beam,) and is converged on the recording medium 216, and reproduces the information beam from the recorded interference fringes (digital volume hologram). The information beam reflected by the reflection film inside the recording medium 216 becomes a circularly polarized beam (for example, an anticlockwise circularly polarized beam) rotating in the opposite direction, and enters the object lens 214 again to be made into a parallel light beam, and is reflected by the mirror 213, and transmits the QWP 212, and is converted into a linear polarized light beam (S polarized beam) vertical to the outward polarized beam. At this time, an intermediate image of the display pattern of the SLM 204, reproduced from the object lens 214 at a distance of F, is formed.

The light beam transmitting the DBS 211 passes through the second relay lens 210, the mirror 209, and the first relay lens 208, and is oriented to the PBS 207. The light beam reflected by the PBS 207 is re-imaged as the intermediate image of the display pattern of the SLM 204 at a position conjugated with the SLM 204. At this position, there is an opening 17 placed in advance, which shades an unnecessary reference beam existing in the periphery area of the information beam. By the lens 218, the re-imaged intermediate image forms the display pattern of the SLM 204 of the information beam portion only on the light sensing device 219 of the CMOS sensor, and the like. As a result, the unnecessary reference beam 205 does not enter the light sensing device 219, and, therefore, the reproduced signal of a good S/N (signal to noise ratio) can be obtained.

First Embodiment

First, a concept of the correction of a positional shift in the present invention will be described. In a holographic memory system, due to various factors, the positional shift may be generated in the positional relationship between the light beam incident on a two-dimensional spatial light modulator (SLM) and a spatial light modulator. The present invention corrects this shift or attempts compensation for this shift. The correction of the positional shift will be described below by using FIGS. 1 to 3.

Figure 1A:
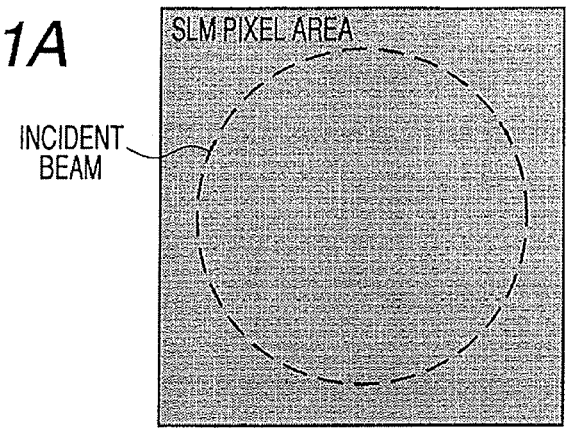
FIGS. 1A, 1B and 1C are views showing the relationship between the position of an incident beam on a spatial light modulator and a modulation information display position.
Figure 1B:
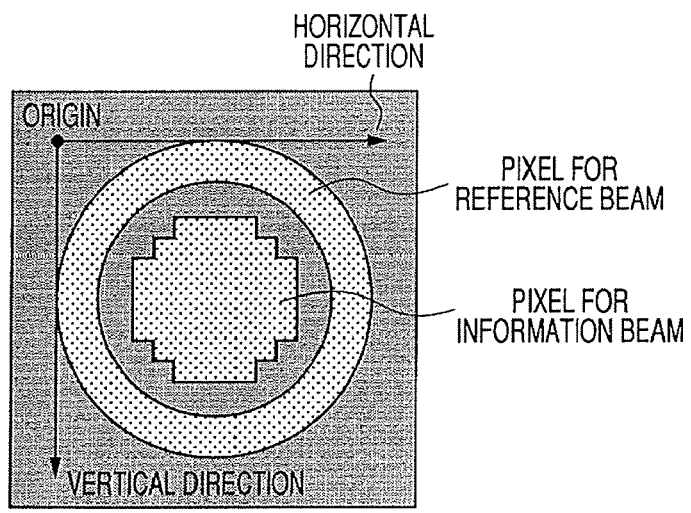
Figure 1C:
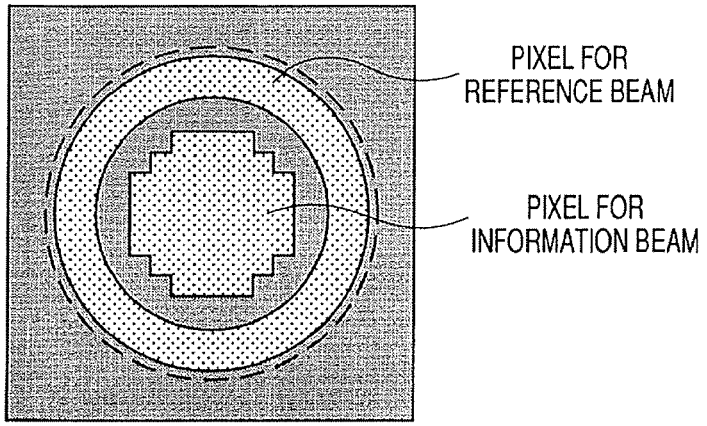

FIGS. 1A to 1C show a case wherein the positional relationship between an incident beam on the SLM and the SLM is according to a design. As shown in FIG. 1A, a two-dimensional SLM comprises a square effective pixel area, and inside this effective pixel area, is arranged a large number of pixels in a matrix pattern. The incident beam is circular, and its diameter is smaller than the effective pixel area of the SLM. If the positional relationship is according to the design, the incident beam hits against the center of the pixel area. As described in the paragraph of the Related Art discussed above, though the SLM is set with an information beam area and a reference beam area surrounding the former, an example of the arrangement of the information beam area and the reference beam area is shown as an area of the pixel for an information beam and an area of the pixel for a reference beam in FIG. 1B. Here, a coordinate is set as shown in a horizontal direction and a vertical direction. FIG. 1C shows the incident beam and the relationship between the information beam area and the reference beam area in the case wherein the positional relationship is correct. The outer periphery of the reference beam is along the circle, and the diameter of this circle is slightly smaller than the diameter of the outer periphery circle of the incident beam. If the positional relationship is correct, the outer periphery circle of the incident beam and the outer periphery circle of the reference beam are concentric, and the circle of the reference beam area are concentric, and the circle of the reference beam is completely included in the circle of the incident beam.

Figure 2A:
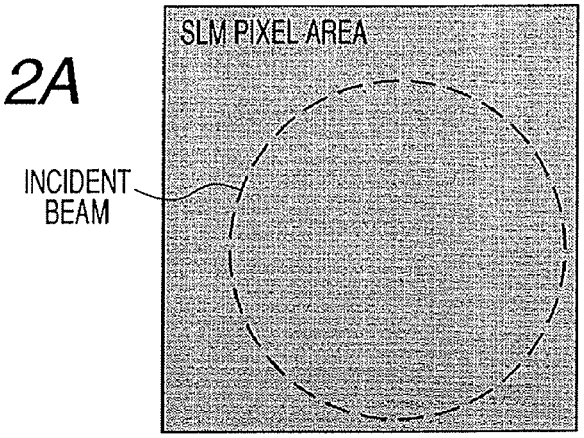
FIGS. 2A, 2B and 2C are views showing the relationship between the incident beam position on the spatial light modulator and the modulation information display position when the incident beam is shifted.
Figure 2B:
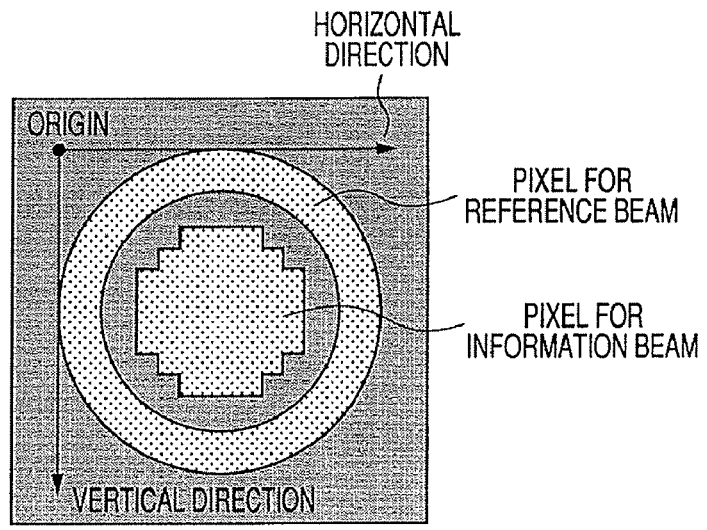
Figure 2C:
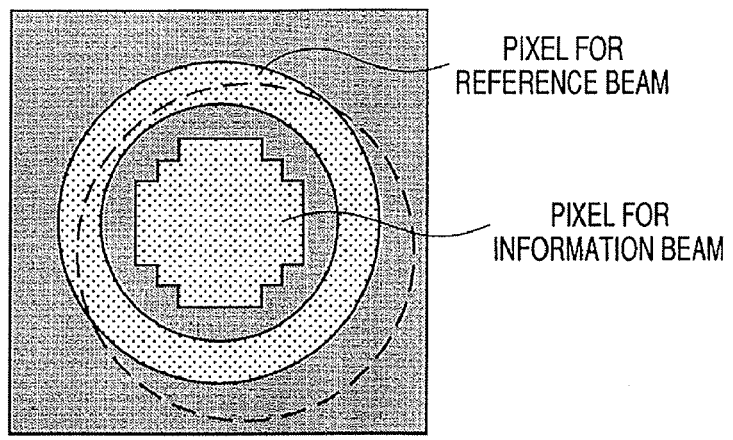

In contrast to this, FIGS. 2A to 2C show a case in which the positional shift occurs between the incident beam and the SLM. FIG. 2A shows a case in which the incident beam hits, but is out of touch with, a center of the effective pixel area of the SLM. Even in this case, as shown in FIG. 2B, the information beam area and the reference beam area are, similar to the case of FIG. 1B, arranged with the center point of the effective pixel area of the SLM as a center. As a result, as shown in FIG. 2C, the incident beam hits by displacing from the information beam area and the reference beam area, and particularly, the incident beam does not hit a part of the reference beam area. If, in this state, a part of the reference beam to be incident on the recording medium is missing, and, therefore, the original hologram information cannot be recorded if at the recording time, and, if at the reproducing time, a recorded normal hologram cannot be reproduced.

Figure 3A:
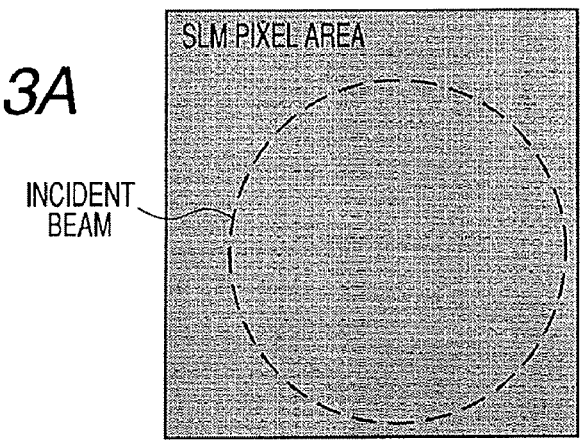
FIGS. 3A, 3B and 3C are views showing the relationship between the incident beam position on the spatial light modulator and the modulation information display position after the correction of the modulation information display position is performed.
Figure 3B:
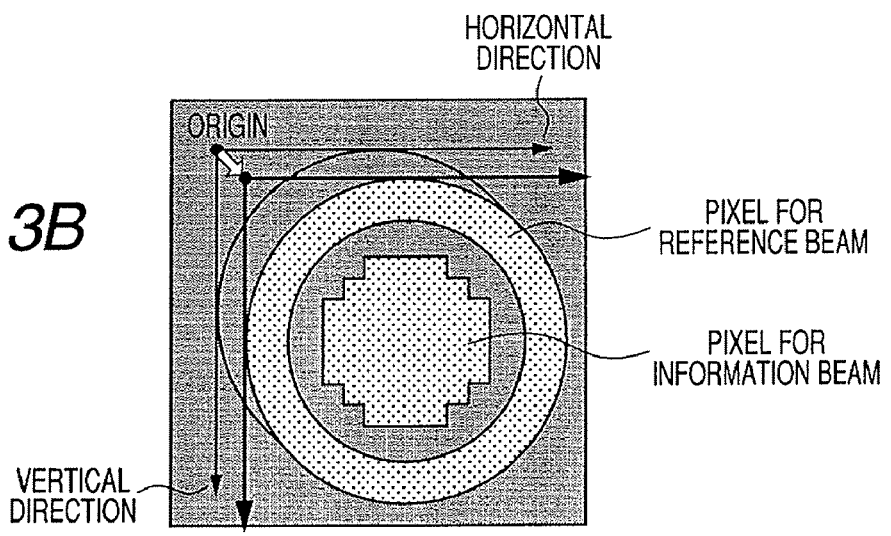
Figure 3C:
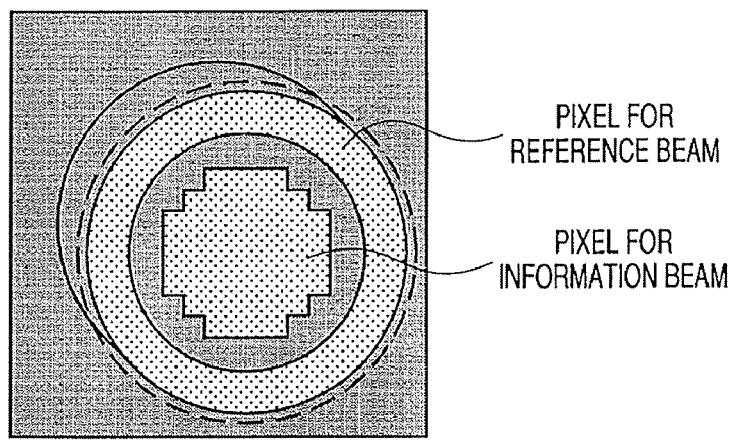

Hence, in the present embodiment, the positional shift in the incident beam is detected, and the positional shift amount is fed-back so as to perform the correction based on that positional shift amount, thereby preventing the positional shift between the incident beam and the information beam area, and the reference beam area from occurring. FIGS. 3A to 3C are views explaining this correction. FIG. 3A, similar to FIG. 2A, shows that the incident beam hits by displacing from the effective pixel area of the spatial light modulator. Hence, in the present embodiment, upon detecting the direction and magnitude of the positional shift of the incident beam, the positions of the information beam area and the reference beam area in the spatial light modulator are also shifted by that detected direction and magnitude, as shown in FIG. 3B. As a result, as shown in FIG. 3C, the information beam area and the reference beam area are put into a normal relationship for the incident beam. As a result, at the recording time, normal recording can be performed, and at the reproducing time, also, normal reproducing can be performed.

In the present embodiment, as the spatial light modulator, for example, the DMD described above in the paragraph of the Related Art, a reflection type light interference modulator, to be described later, or a reflection type liquid crystal on silicon (LCOS) can be used. Whichever spatial light modulator is used, modulation information on the information beam and the reference beam is given to each pixel. In the spatial light modulator, shift registers for the horizontal direction and the vertical direction are arranged on the periphery of the effective pixel area, and information as to whether each pixel is put into a state of [1] or [0] is written in these shift registers, for example, as the information on voltage. Then, based on the data stored in these shift registers, each pixel is driven, so that each pixel is put into whichever states of [1] or [0]. Hence, by changing each pixel according to the shift amount detecting a read start position from the shift register, it is possible to effectively shift the positions of the information beam area and the reference beam area in the spatial light modulator, and to perform the correction according to the shift of the incident beam.

When the DMD is used as the spatial light modulator, in the case of the pixel put into [1], the mirror is oriented toward the normal reflection direction, and in the case of the pixel put into [0], the mirror is oriented toward the direction other than the reflection direction, and only the light from the pixel oriented towards the normal reflection direction is oriented to the recording medium. In the case of the reflection type light interference modulator, in the case of the pixel put into [1], the reflectance by the interference becomes high, and in the case of the pixel put into [0], the reflectance becomes low, and the reflection beam from such a reflection type light interference modulator is oriented to the recording medium. In the case of the reflection type liquid crystal on silicon, in the case of the pixel put into [1], the pixel is displayed white, due to the relationship between a polarized filter and a test plate by the control of retardation of the liquid crystal, and in the case of the pixel put into [0], the pixel is displayed black, contrariwise, and the light from the pixel displayed white is oriented to the recording medium.

Next, the optical system of the optical information recording and reproducing apparatus of the first embodiment will be described. In the optical information recording and reproducing apparatus of the present embodiment, the spatial light modulator and the light sensing device may be separately provided or the spatial light modulator and the light sensing device may be provided as a modulator/light sensing device integrated on the same semiconductor substrate. Further, though this optical information recording and reproducing apparatus has a shift amount detector that detects a shift of the positional relationship between the incident beam and the spatial light modulator, in the case of using the modulator/light sensing device, the apparatus may be separately provided from the modulator/light sensing device, or the modulator/light sensing device may be allowed to function as a shift amount detector, when the spatial light modulator and the light sensing device are separately provided from the spatial light modulator and the light sensing device.

Figure 4:
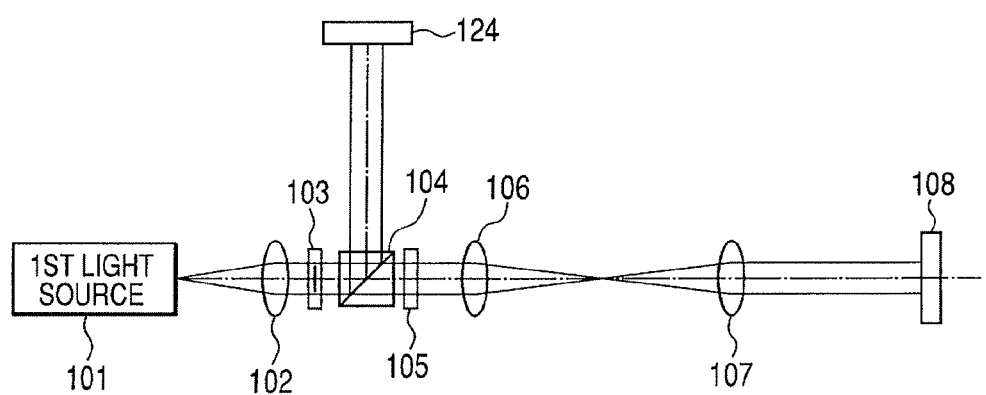
FIG. 4 is a view for explaining an optical system of the optical information recording and reproducing apparatus of a first embodiment of the present invention, and is a view showing from a light source to a modulator/light sensing device at the recording time.
Figure 5:
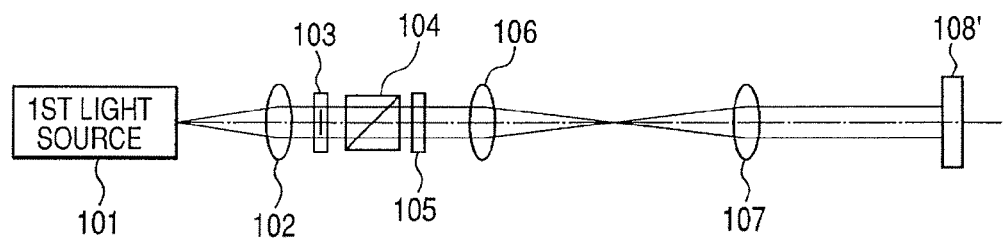
FIG. 5 is a view for explaining another example of the optical system of the optical information recording and reproducing apparatus of the first embodiment, and is a view showing from the light source to the modulator/light sensing device at the recording time.
Figure 6:
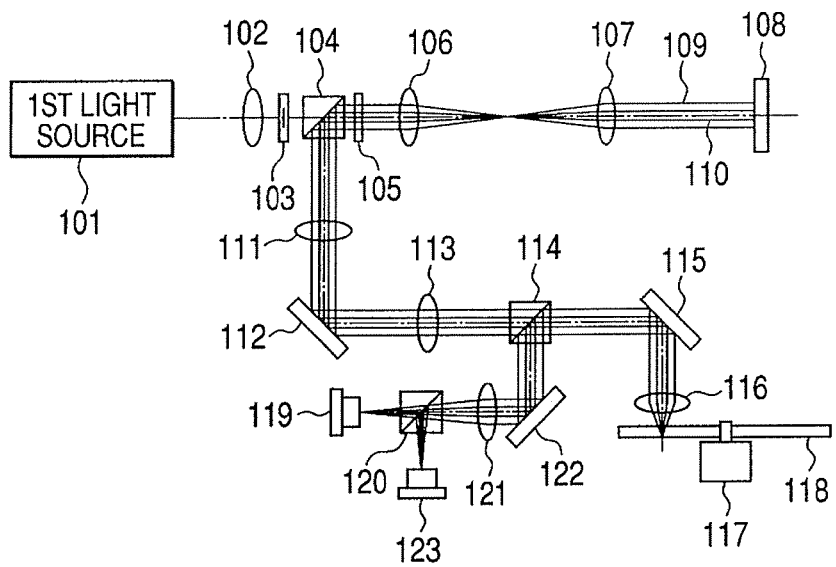
FIG. 6 is a view for explaining the optical system of the optical information recording and reproducing apparatus of the first embodiment, and is a view showing from the modulator/light sensing device to the recording medium at the recording time.
Figure 7:
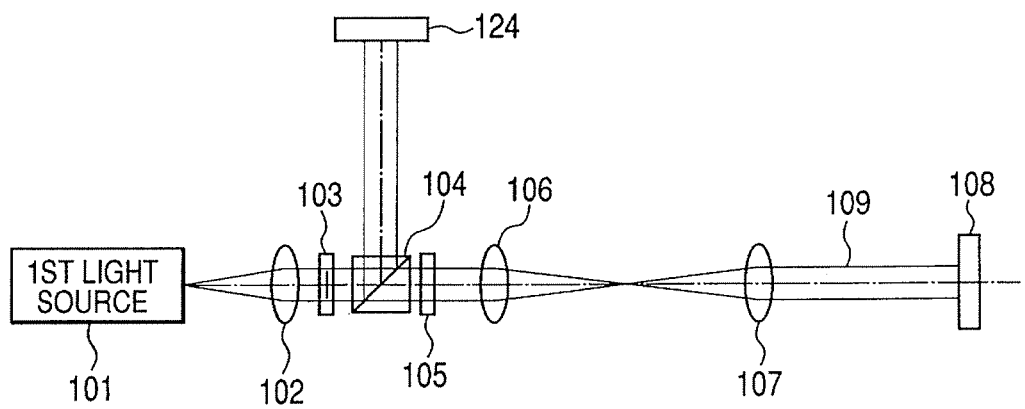
FIG. 7 is a view for explaining the optical system of the optical information recording and reproducing apparatus of the first embodiment, and is a view showing from the light source to the modulator/light sensing devices at the reproducing time.
Figure 8:
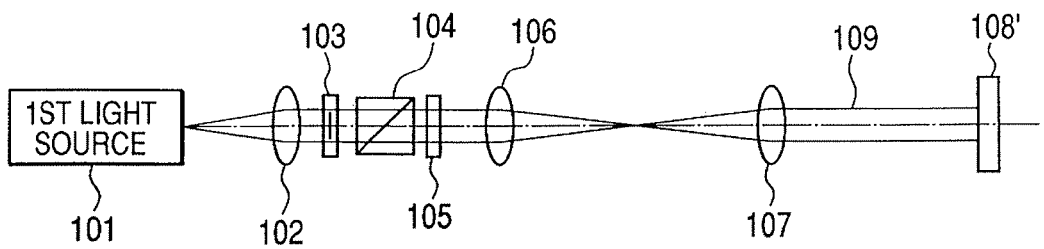
FIG. 8 is a view for explaining another example of the optical system of the optical information recording and reproducing apparatus of the first embodiment, and is a view showing from the light source to the modulator/light sensing device at the reproducing time.
Figure 9:
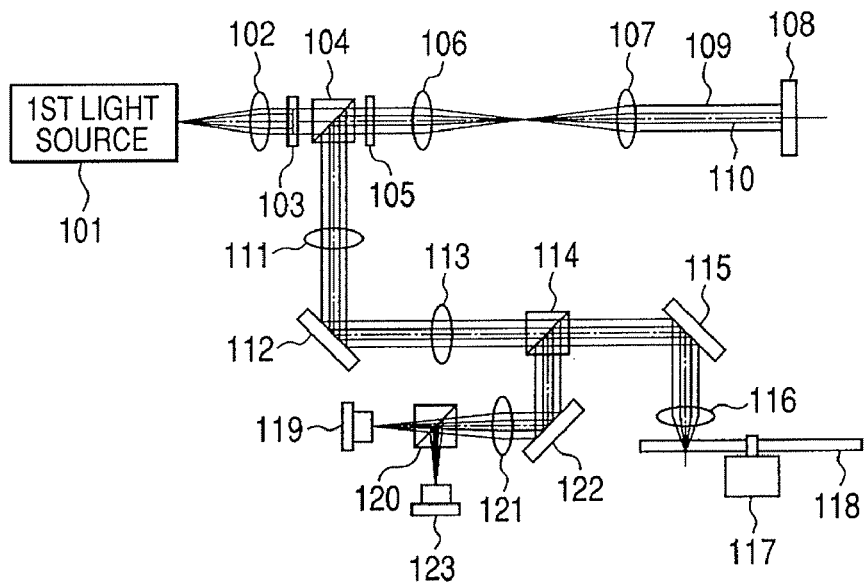
FIG. 9 is a view for explaining another example of the optical system of the optical information recording and reproducing apparatus of the first embodiment, and is a view showing light received from the modulator/light sensing devices through the recording medium at the reproducing time.

FIGS. 4 to 9 explain the optical system of the optical information recording and reproducing apparatus of the first embodiment. The optical information recording and reproducing apparatus of the present embodiment performs the recording of the information, for example, by writing a volume hologram in a disk-shaped hologram recording medium 186, and by obtaining the reproduced image of the volume hologram, reproducing of the information is performed. The illustrated optical system comprises a first light source that generates a laser beam used for the recording and reproducing of the information, a modulator/light sensing device (SLM/CMOS) integrally provided with a spatial light modulator (SLM) for modulating a signal beam, a two-dimensional light sensing device for detecting a reproduced beam, and a shift amount detector that detects a shift amount for the modulator/light sensing device of the light beam incident on the modulator/light sensing device. FIGS. 4 and 5 show the optical system from the light source at the recording time to the spatial light modulator (modulator/light sensing device). FIG. 4 shows a case wherein the shift amount detector is provided separately from the modulator/light sensing device, and FIG. 5 shows a case wherein the modulator/light sensing device also comprises the functions of the shift amount detector. FIG. 6 shows the optical system from the spatial light modulator (modulator/light sensing device) at the recording time to the recording medium (hologram disk). FIGS. 7 and 8 show the optical system from the light source at the reproducing time to the spatial light modulator (modulator/light sensing device). FIG. 7 shows a case wherein the shift amount detector is provided separately from the modulator/light sensing device, and FIG. 8 shows a case wherein the modulator/light sensing device also has the functions of the shift amount detector. FIG. 9 shows an entirety of the optical system subsequent to the shift correction at the reproducing time.

First, by using FIGS. 4 to 6, a description will be made of a case in which the recording is made on a recording medium 118, which is the hologram disk. In FIG. 4, the light beam emitted from a first light source 101, consisting of a green laser, and the like, is made into a parallel light beam by a collimator 102, and enters a mask element 103. The mask element 103 has the functions of masking a portion equivalent to the information beam of the center portion of the light beam. As the mask element 103, for example, the liquid crystal on silicon type can be used. The mask that shields the center portion of the light beam may be inserted into the optical path. At the time of recording the information, this mask element 103 does not function, but allows all the light beams to transmit. The light that transmits the mask element 103 enters a polarized beam splitter (hereinafter abbreviated as PBS) 104.

From among the light beams having entered the PBS 104, a P polarized component passes through there as it is, but an S polarized component is reflected, and the component shown in FIG. 4 enters a shift amount detector 124. The shift amount detector 124 is composed of a two-dimensional CMOS-sensor, and the like, and detects the shift amount in the incident beam by measuring a position of the incident beam on the shift amount detector 124.

The light beam having transmitted the PBS 104 by the P polarization transmits a quarter wave plate (hereinafter abbreviated as QWP) 105, and passes through a first relay lens 106 and a second relay lens 107, and is irradiated on a modulator/light sensing device 108 (FIG. 4) mounted with a spatial light modulator (SLM) and a CMOS sensor by one chip or a modulator/light sensing device 108 (FIG. 4) mounted with a spatial light modulator (SLM) and a CMOS sensor by one chip or a modulator/light sensing device 108' (FIG. 5). When a light interference modulator (iMOD) configured not to allow a polarized state to be changed as the SLM is used, the QWP 105 may be provided in advance at an in-plane setting angle, in which the linear polarized light changes 90° forward and backward. Further, in the case of a reflection type liquid crystal on silicon (LCOS) configured to allow the polarized state to change 90° as the SLM, the QWP 105 is not required. However, in reality, due to the design of the SLM, refraction with the actual thing, and differences in the thickness of the liquid crystal, and the like, and moreover, in the case of the liquid crystal, due to the necessity of slightly (several degrees) inclining the orientation of the liquid crystal in an initial state, referred to as a pre-tilt, some reflections from the PBS 104 are observed at the time of the black [0], and a contrast of the white/black becomes smaller. When this contrast is not permitted in terms of the system, the QWP 105 is installed in order to make some reflections from the PBS 104 at the time of the black [0] into the minimum value, thereby adjusting the in-plane setting angle. Here, the light interference modulator (iMOD) is an element having a reflection electrode and a semi-transparent film arranged in front of the reflection electrode. The semi-transparent film has the functions of allowing the incident beam to transmit at some ratios and reflecting the remaining beam. This light interference modulator performs a light modulation by using the interference between the reflection beam from the semi-transparent film surface when the light enters from the semi-transparent film side, and the reflection beam having transmitted the semi-transparent film and reflected by the reflection electrode. The reflection electrode has also a property of reflecting the light. Here, by changing a distance of the space (air gap) between the semi-transparent film and the reflection electrode, the reflectance as an entirety of the incident beam can be controlled, and intensity of the reflection beam can be modulated. The distance of the air gap can be controlled in such a manner that a signal voltage is applied between the semi-transparent film and the reflection electrode, and the semi-transparent film is displaced by Coulomb force by an electrical field generated by the signal voltage. As the semi-transparent film, a thin film of Ti (titanium) can be preferably used.

In the optical system shown in FIG. 5, the incident beam having entered the modulator/light sensing device 108' is detected, so that the shift amount for the modulator/light sensing device 108' is detected. When the SLM and the light sensing device, which are superposed in a longitudinal direction for each pixel so that the SLM comes to the incident beam side, are used, similar to the reproducing time of the reproduced light from the recording medium, all the pixels are uniformly put into a transmission mode.

In the cases shown in FIGS. 4 and 5, according to the detected shift amount (shift direction and magnitude), a correction of the shift of the positional relationship between the information beam area and the reference beam area of the modulator/light sensing device 108 (108') and the incident beam is performed. As a method of the shift correction, in addition to shifting a start position in the above-described shift register, there is also a method of holding the modulator/light sensing device 108 (108'), for example, on an XY stage, and changing the physical position of the modulator/light sensing device 108 (108') by operating the XY stage.

Hereafter, a description will be made separately of a case (iMOD/CMOS), in which the element consisting of the combination of the iMOD and the CMOS is used as the modulator/light sensing device 108, and the case (LCOS/CMOS), in which the element consisting of the combination of the LCOS and the CMOS is used.

The case of iMOD/CMOS:

The light beam having transmitted the QWP 105 is converted into a circularly polarized beam (for example, a clockwise circularly polarized beam), and passes through the first relay lens 106, and the second relay lens 107, and is irradiated on the modulator/light sensing device 108. The light reflected by the pixel representing the information on [1 (white)] by the SLM of the modulator/light sensing device 108 is reflected in the direction of the recording medium 118 with a high reflectance, and the light reflected by the pixel representing the information on [0 (black)] of the SLM is only slightly reflected in the direction of the recording medium 118 by the interference. Similar to the conventional example, the SLM of the collinear system is provided with a portion to modulate the information beam 110 and a portion to modulate the reference beam 109 circularly surrounding the information beam.

Described below, by referring to FIG. 6, the light beam reflected by the SLM of the modulator/light sensing device 108 becomes a circularly polarized beam rotated in an opposite direction (for example, an anticlockwise circularly polarized beam). The light beam having passed through the second relay lens 107 and the first relay lens 106 transmits the QWP 105, and is converted into an S polarized beam, and is reflected by the PBS 104, and is oriented in the direction of the recording medium 118.

The case of LCOS/CMOS:

On the other hand, when the LCOS/CMOS is used as the modulator/light sensing device 108, the light beam having passed through the PBS 104 passes through the first relay lens 106 and the second relay lens 107, and irradiates the modulator/light sensing device 108. The light reflected by the pixel representing the information on [1 (white)] on the SLM is converted into an S polarized beam, and the light reflected by the pixel representing the information on [0 (black)] holds a state of the P polarized beam. Similar to the conventional example, a portion to modulate the information beam 110 and a portion to modulate the reference beam 109 circularly surrounding the information beam are provided on the SLM of the collinear system.

Described below, by referring to FIG. 6, from among the light beams, the S polarized beam is reflected by the PBS 104, and is oriented toward the recording medium 118, and the P polarized beam transmits the PBS 104, and is not oriented toward the recording medium 118.

Even when the iMOD/CMOS is used or the LCOS/CMOS is used, the reference beam 109 and the information beam 110 reflected by the pixel representing the information on [1 (white)] in the SLM of the modulator/light sensing device 108 are reflected by the PBS 104, and are oriented toward the recording medium 118 by passing through a third relay lens 111, a mirror 112, a fourth relay lens 113, and a dichrolic beam splitter (hereafter abbreviated DBS) 114, and are reflected by a mirror 115, and enter an object lens 116 of the focal length F. The patterns displayed in the SLM of the modulator/light sensing device 108 form an intermediate image in front of the object lens 116 just by F by third and fourth relay lenses 111 and 112. As a result, a 4F optical system is configured in which each of the pattern images (not shown) on the SLM of the modulator/light sensing device 108, the object lens 116, and the recording medium 118 is arranged apart just by a distance of F.

The disk-shaped recording medium 118 is rotatably held on a spindle motor 117. By the object lens 116, the reference beam 109 and the information beam 110 are converged on the recording medium 118, and form an interference fringe by mutual interference. A high polymer material inside the recording medium 118 is recorded with interference fringe patterns at this recording time as a refractive index distribution, and a digital volume hologram is formed. If the information beam 110 is modulated according to the information to be recorded, the recording medium 118 is formed with the digital volume hologram according to that information. Incidentally, a reflection film is provided inside the recording medium 118.

This optical information recording and reproducing apparatus is provided with a second light source 119 consisting of a red laser, and the like, having no sensitivity for the recording medium 118, other than the first light source 101 that performs the recording and reproducing of the hologrammed optical information. By using this second light source 119 with the reflection film of the recording medium 118 taken as a reference surface, it is possible to detect displacement of the recording medium 118 with a high degree of accuracy. Therefore, even if side-runout or decentering occurs in the recording medium 118, a recording spot can be allowed to dynamically follow the recording medium surface by using optical servo technology and the interference fringe patterns (digital volume hologram) can be recorded with a high degree of accuracy. Such tracking will be briefly described below.

The light beam emitted from the second light source 119 transmits through a beam splitter (hereinafter abbreviated as BS) 120, and is made into a parallel light beam by a lens 121, and is reflected by a mirror 122 and the DBS 114, and is oriented to the recording medium 118. After that, the light beam is reflected by the mirror 115, and enters the object lens 116, and is converged on a reflection film of the recording medium 118 as a fine optical spot. The reflected light beam enters the object lens 116 again to be made into the parallel light beam, and is reflected in order by the mirror 115 and the DBS 114, and, similar to the outward route, passes through the mirror 122 and the lens 121, and a part of the light beam is reflected by the beam splitter BS 120, and is guided to a light detector 123. The light detector 123 has a plurality of light receiving surfaces, and detects the positional information on the reflection surface by the known method, and based on this detection, performs focusing and tracking of the object lens 116.

Next, by using FIGS. 7 to 9, a description will be made of a case in which the reproducing of the recording information is performed from the recording medium (hologram disk) 118.

The light beam emitted from the first light source 101 is irradiated on the modulator/light sensing device 108, similar to the recording time. At this time, the intensity of the light from the first light source 101 is less than the intensity used at the recording time, so that the information is recorded in the recording medium 118 is not destroyed. In the present embodiment, even when performing the reproduction, the detection of the shift in the incident beam is performed. As shown in FIG. 7, the light beam emitted from the first light source (green laser) 101 enters the PBS 104, and similar to the recording time, the light beam having transmitted the PBS 104 by P polarization enters the modulator/light sensing device 108. In contrast to this, the polarized beam of the S polarization is reflected by the PBS 104, and enters the shift amount detector 124, thereby detecting the shift amount. Alternatively, as shown in FIG. 8, the shift amount is detected by the incident beam having transmitted the PBS 104 and enters the modulator/light sensing device 108'. When the element is used, in which the SLM and the light sensing device are superposed in a longitudinal direction for each pixel, so that the SLM comes to the incident beam side as the modulator/light sensing device 108', similar to the reproducing time of the reproduced beam from the recording medium, all the pixels are uniformly put into a transmission mode. In the cases shown by FIGS. 7 and 8, a correction of the shift of the positional relationship between the modulator/light sensing device 108 (108') and the incident beam is performed according to the detected shift amount (shift direction and magnitude) similar to the case of recording.

At the reproducing time, the mask element 103 masks a portion equivalent to the information beam of the center portion of the light beam. In the present embodiment, the liquid crystal on silicon configuring the mask element 103 allows the center portion only of the light beam to rotate 90° in a polarized direction, so as to be made into the S polarized beam, and this beam is reflected by the subsequent PBS 104, such that it does not reach the modulator/light sensing device 108. In the mask element 103, the position in which the light beam is masked changes according to the detected shift amount, and, even when the light beam is shifted, the portion equivalent to the information beam is certainly masked. Further, the mask shielding the center position may be inserted into the optical path. When the mask is inserted, a mask position also can be moved to the measured quantity of the shift amount.

Assuming that the shift correction is performed as described above, the first relay lens 106 and the second relay lens 107 have the task of forming the image of the mask element 103 on the SLM of the modulator/light sensing device 108 (108'). As a result, the element only in the portion of the reference beam is irradiated, and the portion of the information beam is accurately shielded by the image of the mask element 103. In the SLM of the modulator/light sensing device 108, only the portion that modulates reference beam 109 displays the information on [1 (white)], and the portion that modulates the information beam 110 all display the information on [0 (black)]. Consequently, only the light reflected by the pixel in the portion that modulates the reference beam 109 is reflected in the direction of the recording medium 118. The light beam of the pixel in the portion that reflects the information beam 110 is neither reflected in the direction of the recording medium 118, nor is it even radiated by nature, and therefore, the information beam having a much better S/N ratio can be produced as compared to the conventional example.

The reference beam 109 similar to the recording time is reflected by the PBS 104, and is converged on the recording medium 118, and the information beam is reproduced from the recorded interference fringes. The information beam (that is, the reproduced beam) reflected by the reflection film inside the recording medium 118 re-enters the object lens 116 so as to be made into the parallel light beam, and is reflected by the mirror 115. At this time, an intermediate image of the display pattern of the SLM reproduced at a distance of F from the object lens 116 is formed.

The light beam having transmitted the DBS 114 is oriented to the PBS 104 by passing through the fourth relay lens 113, the mirror 112, and the third relay lens 111, and is re-imaged (not shown) as an intermediate image of the display pattern of the SLM at the position conjugated with the mask element 103 by the fourth relay lens 113 and the third relay lens 111. This re-imaged intermediate image is reflected by the PBS 104, and is imaged on the modulator/light sensing device 108 (108') by the first relay lens 106 and the second relay lens 107. Incidentally, in the present embodiment, a CMOS sensor comprising a photo diode and a MOS transistor that amplifies the light receiving signal detected by the photo diode for each pixel as the light sensing device, is used. Moreover, in the present embodiment, since an element that provides the spatial light modulator (SLM) and the light sensing device, such as the CMOS sensor, or the like, on the same chip is used as the modulator/light sensing device 108, there is no need for a complicated mechanism to position both of them. Further, this can lead to the cost-cutting and miniaturization of the optical system.

In the optical information recording and reproducing apparatus of the present embodiment, since the shift of the positional relationship between the light beam before receiving the modulation by the SLM and the SLM can be corrected both at the recording time and reproducing time, a recording error and a reproducing error can be decreased to a large extent.

Figure 10:
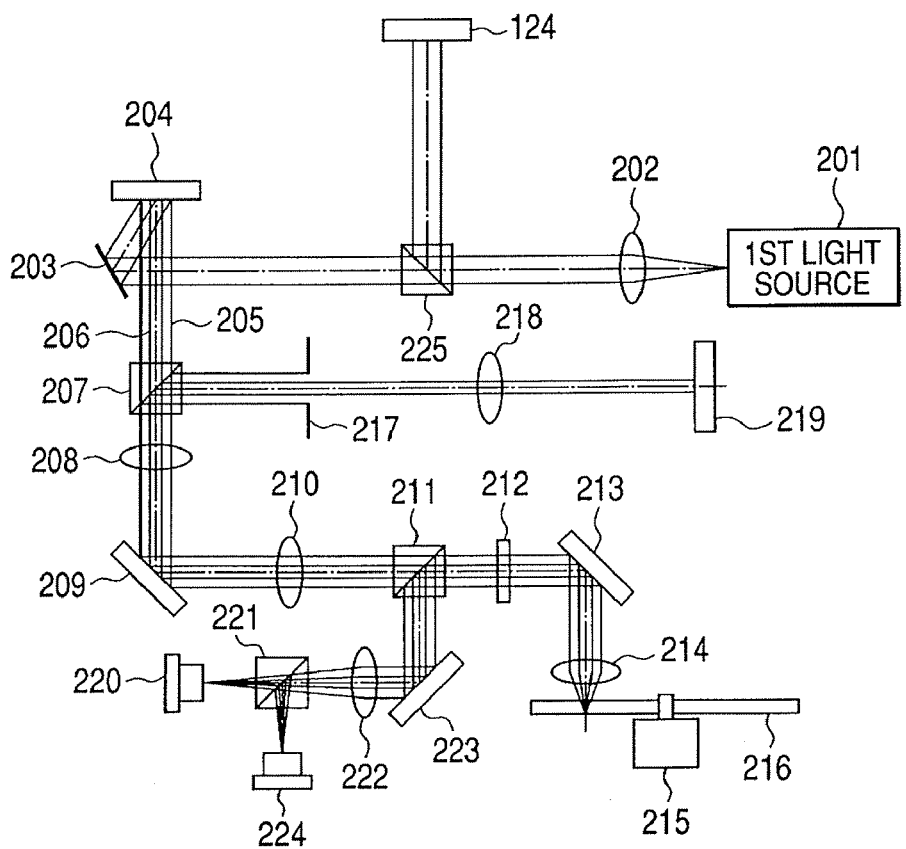
FIG. 10 is a view for explaining the optical system at the recording time in still another example of the first embodiment.

Such a mechanism that corrects the shift of the positional relationship between the incident beam and the spatial light modulator also can be adapted to the optical system in which the spatial light modulator and the light sensing device are provided separately. FIG. 10 shows an optical system from the light source at the recording time until the spatial light modulator in the case when the shift amount detector is added to the conventional optical system using the DMD as the spatial light modulator. This optical system inserts the PBS 225 in the midst of the optical path between the collimator 202 and the mirror 203 in the optical system shown in FIG. 25, and the S polarized component reflected by the PBS 225 is allowed to enter the shift amount detector 124, thereby detecting the shift amount. Even in this optical system, based on the detected shift amount, the correction of the shift is performed at the recording time and the reproducing time. In this optical system, as the spatial light modulator (not integrated with the light sensing device), the reflection type light interference modulator and the reflection type liquid crystal on silicon also can be used.

Next, a detection method of the shift amount will be described. As the detection method of the shift amount, though a variety of methods are conceivable, for example, there is such a method as described below.

Figure 11:
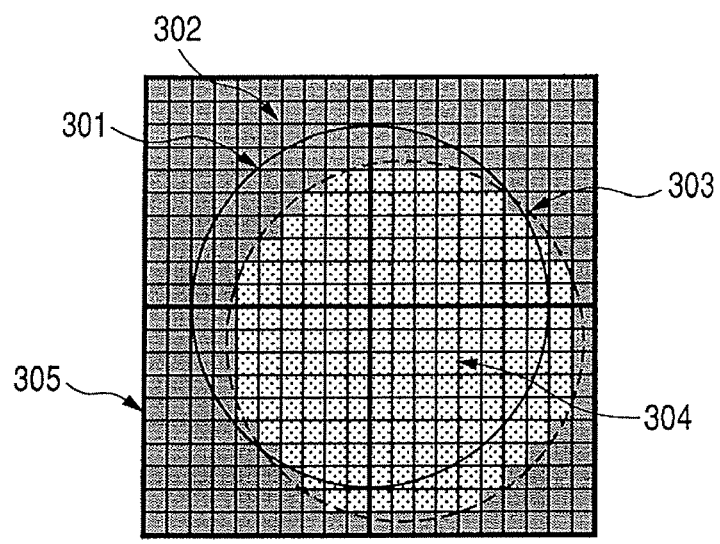
FIG. 11 is a view showing the arrangement of pixels in the shift amount detector.

The shift amount detector 124 comprises the light sensing device, such as photo diodes arranged in a matrix pattern, and the like. FIG. 11 shows an arrangement of pixels in the shift amount detector 124, and in the Figure, a small quadrangle 302 shows an area for one pixel portion. When the modulator/light sensing device 108' is used as the shift amount detector, the same is true in this case. An area 305 dividing the effective pixel area of the shift amount detector 124 into four equal portions up and down and left and right is considered. This area is shown by a thick line in FIG. 11. Further, a circle 301 in FIG. 11 shows an incident beam 301, which ideally hits the center of the spatial light modulator (modulator/light sensing device 108 and 108'), and a circle 303 arranged by displacing from the circle 301 shows an incident beam, of which a positional relationship is shifted from the spatial light modulator, while an area 304 shows the pixels which the shift light beam 301 has hit.

In each of the four areas 305, the number of pixels (the pixel 304 in the Figure) which have received the light at equal to or more than a certain threshold value is determined, and from the difference in the number of pixels, the shift amount can be determined. The calibration relationship between the difference in the number of pixels and the shift amount is determined in advance, and its calibration relationship may be stored in a feedback mechanism for the shift amount correction.

Figure 12A:
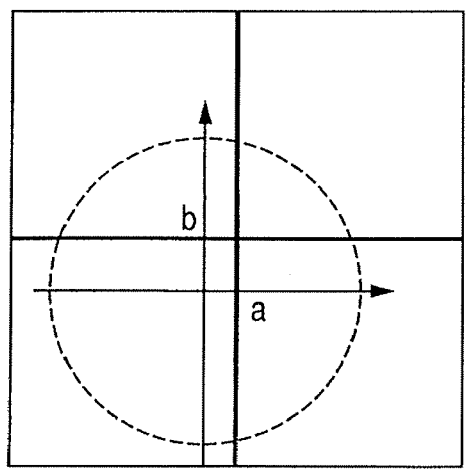
FIGS. 12A and 12B are views for explaining the measurement of the shift of the optical axis of an incident beam.
Figure 12B:
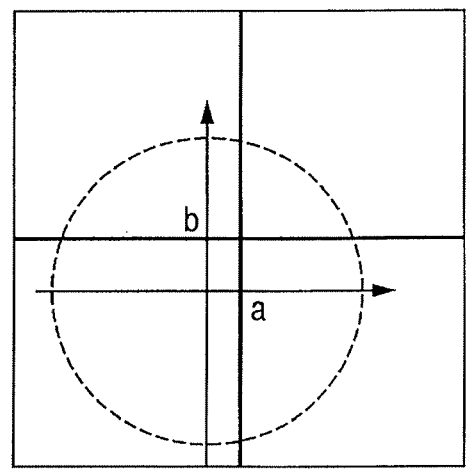

FIGS. 12A and 12B show one example to determine the shift amount in the case in which the incident beam is shifted from the center of the spatial light modulator just only to the left and below (a and b). FIG. 12A shows a case in which the shift in the X axis (horizontal) direction is determined, and FIG. 12B shows a case in which the shift in the Y axis (vertical) direction is determined. Describing the case of the X axis, when the four areas 305 are divided into the right and the left, the area of the incident beam irradiated on each area is determined, which is substantially represented by the number of pixels having received the light (the number of the pixel 304). Here, when the incident beam is taken as a circle of a radius r, an area superposed on the right or left area (the number of pixels) is determined. As shown in Table 1, a ratio of the left and right areas is similarly decided by a/r. Since the radius r is decided by the sum of the left and right areas, if the left and right areas are known, the shift amount a is uniquely decided. Also with respect to the Y axis direction, the shift amount can be determined by the same procedure.

TABLE 1

| a/r | Ratio(right/left) |
|---|---|
| 1 | |
| 0.9 | 1.90E−02 |
| 0.8 | 5.49E−02 |
| 0.7 | 1.04E−01 |
| 0.6 | 1.66E−01 |
| 0.5 | 2.43E−01 |
| 0.4 | 3.37E−01 |
| 0.3 | 4.53E−01 |
| 0.2 | 5.96E−01 |
| 0.1 | 7.74E−01 |
| 0 | 1.00E+00 |
| −0.1 | 1.29E+00 |
| −0.2 | 1.68E+00 |
| −0.3 | 2.21E+00 |
| −0.4 | 2.96E+00 |
| −0.5 | 4.12E+00 |
| −0.6 | 6.02E+00 |
| −0.7 | 9.63E+00 |
| −0.8 | 1.82E+01 |
| −0.9 | 5.25E+01 |
| −1 | |

Figure 13:
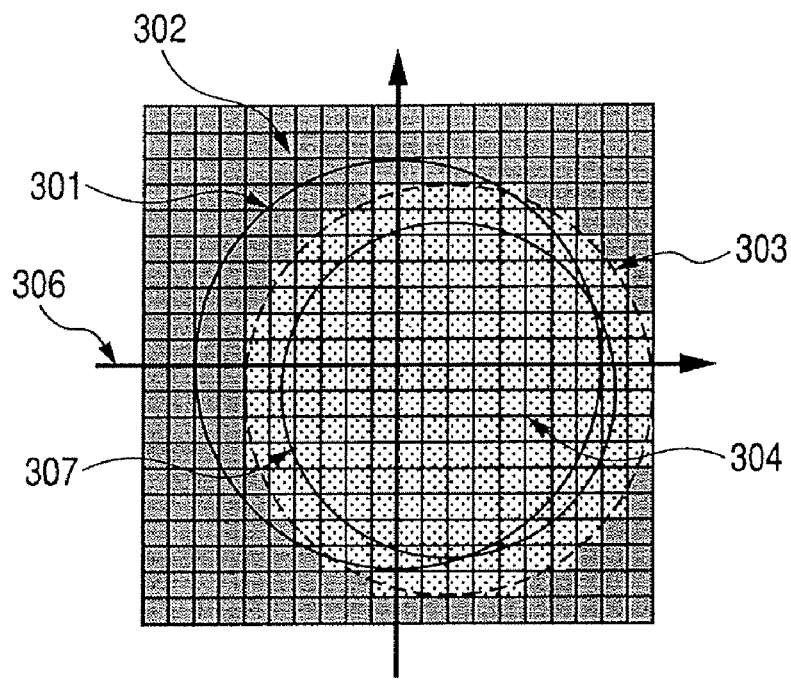
FIG. 13 is a view showing the arrangement of pixels in the shift amount detector.

Further, in the example shown in FIG. 13, X-Y axes 306, with the center of the spatial light modulator as an origin is considered, and an isointensity line 307, and the like, of the received light beam (shifted light beam) is considered. The distribution of the pixels in which an incident beam intensity is equal is supposed to draw a circle if the incident beam is circular. From the minimum value min(x) and the minimum value max(y) of the coordinate of such a pixel in the axis X direction and the minimum value min(y) and the maximum value max(y) in the axis Y direction, the shift amount can be determined as follows:

The shift in the axis X direction=(max(X)+min(X))/2.
The shift in the axis Y direction=(max(y)+min(y))/2.

Figure 14:
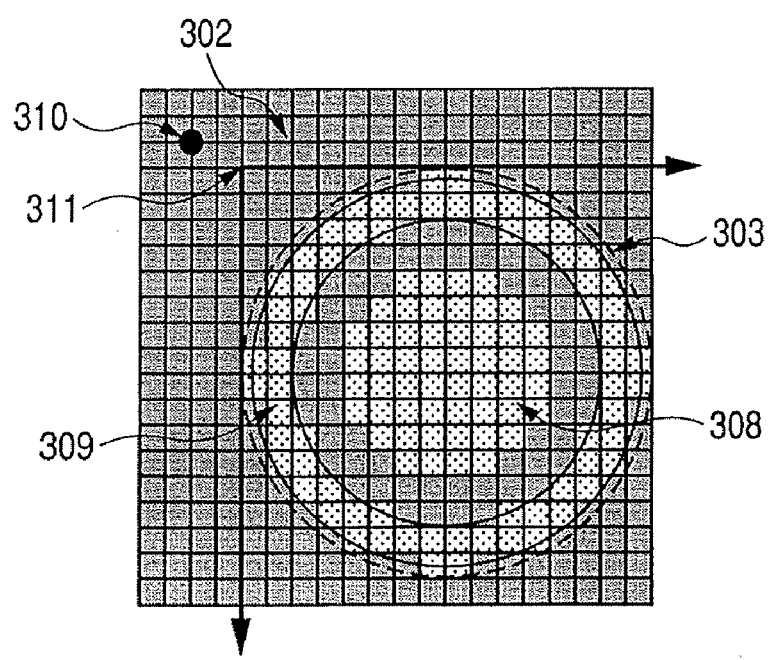
FIG. 14 is a view for explaining an incident beam on the modulator/light sensing device after correcting the shift.

Assuming that the shift of the incident beam is measured by using such a technique or another technique, the shift correction is performed. In the shift correction, when the modulation information for an information beam and a reference beam is displayed in the spatial light modulator, the start positions of the shift registers arranged in every direction of the periphery of the effective pixels of the spatial light modulator are shifted. As shown in FIG. 14, after measuring the shift amount with which the incident beam has shifted, the start position of the shift register was shifted from an initial position 310 of the initial setting to a position 311 after the correction according to the shift amount. As a result, the positions of the pixel 308 for the information beam and the pixel 309 for the reference beam are also shifted, and are adapted to the shifted light beam 303. As a result, both the information beam and the reference beam are normally modulated, and the recording and reproducing are normally performed.

Figure 15:
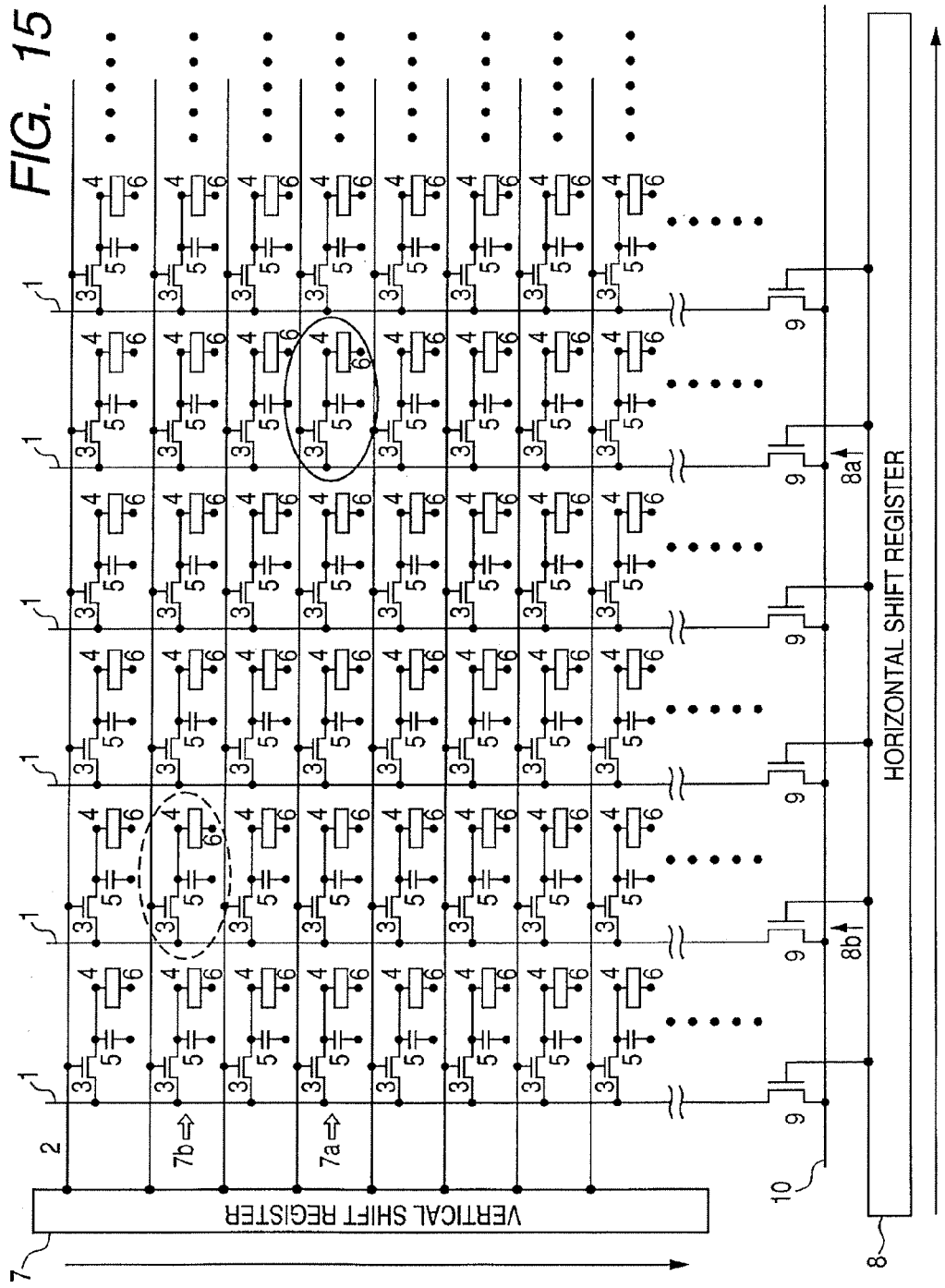
FIG. 15 is an equivalent circuit diagram of the spatial light modulator, and is a view for explaining shift correction.

FIG. 15 shows an equivalent circuit of the spatial light modulator in the present embodiment. Though, in reality, the modulator/light sensing device in which the spatial light modulator and the light sensing device are integrated is used, here, a portion regarding the spatial light modulator only is shown in order to describe only the change of the start position of the shift register. Each of the pixels is configured by a switching transistor 3, an interference structure portion 4, a retention capacity 5, and a common counter electrode 6 of the interference structure portion, and such pixels are arranged in a matrix pattern. For the selection of the pixels, a plurality of vertical signal lines 1 extending in the illustrated vertical direction (column direction) and a plurality of drive lines 2 extending in the horizontal direction (row direction) are provided. One end of the drive line 2 is connected to a vertical shift register 7, and one end of the vertical signal line 1 is connected to a horizontal shift register 8 through a sampling switch 9. A shift register 8 is provided in order to drive the sampling switch 9. Although the detail of the configuration and operation of such a spatial light modulator will be described later, when the start position of the vertical shift register of the initial setting is taken as 7a and the start position of the horizontal register as 8a, the pixel surrounded by a solid line is the start pixel of the spatial light modulator in the initial state. When the shift of the incident beam is measured as -two pixels in the vertical direction and -three pixels in the vertical direction, that positional shift amount (-two pixels and -three pixels) is fed back to the shift register, and the start position of each shift register is taken as 7b and 8b, so that the pixel surrounded by a broken line becomes the start pixel. In this manner, the display positions of the modulation information on the information beam and the reference beam can be changed.

Figure 16:
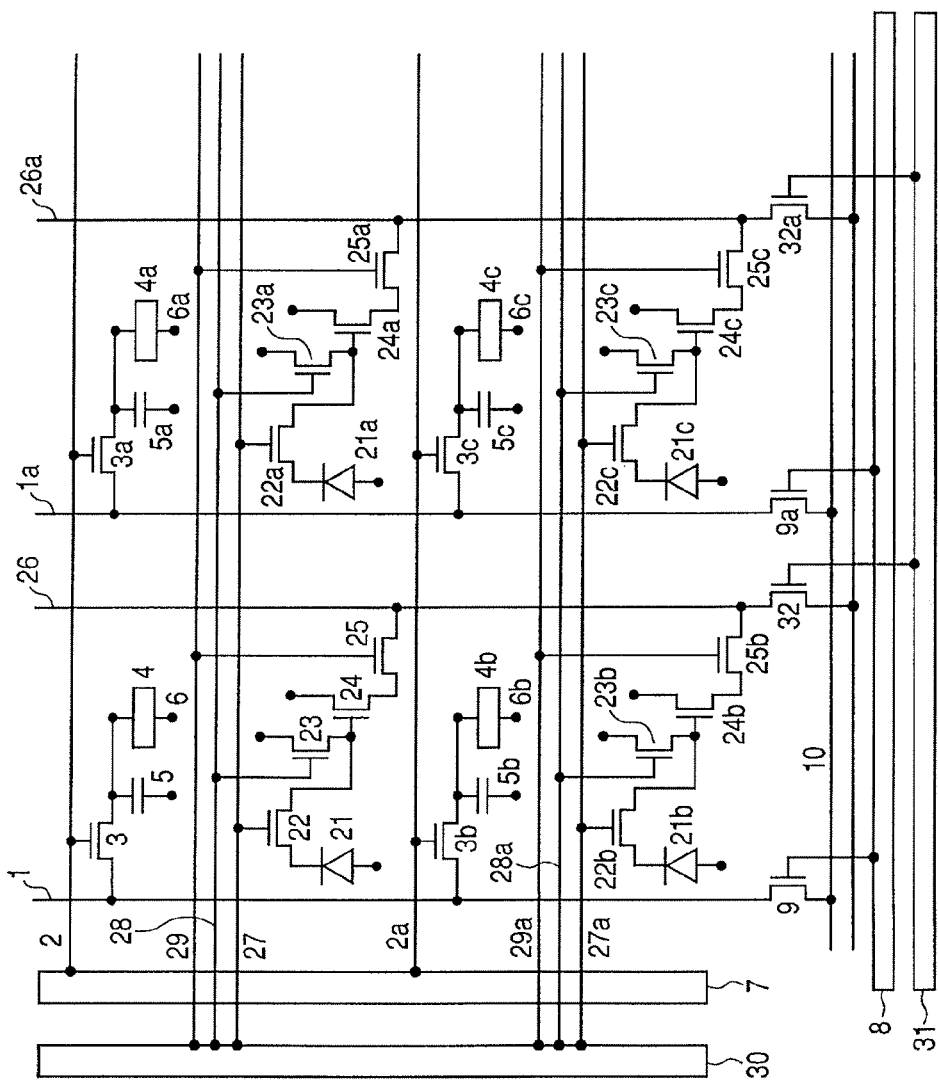
FIG. 16 is an equivalent circuit diagram of the modulator/light sensing device including a drive circuit portion.

Next, the circuit operations of the recording and reproducing in the optical information recording and reproducing apparatus of the present embodiment will be described. FIG. 16 is an equivalent circuit diagram for explaining the modulator/light sensing device integrating the SLM using a reflection type light interference modulator or a reflection type liquid crystal on silicon and the light sensing device consisting of the CMOS sensor used in the present embodiment. In FIG. 16, reference numerals 1 to 10 are given to the component parts relating to the spatial light modulator, and reference numerals 21 to 33 are given to the component parts relating to the light sensing device configured as the CMOS sensor.

A plurality of vertical signal lines, 1, 1a, . . . extending in the column direction (illustrated vertical direction) and a plurality of horizontal drive lines 2, 2a, . . . extending in the row direction (illustrated horizontal direction) are provided, and these lines configure matrix wirings, and the intersecting point with the vertical signal line and the drive line corresponds to each pixel. Consequently, the pixels are arranged in a matrix pattern, the vertical signal line is provided for each column of the pixel arrangement, and the drive line is provided for each row. The vertical signal lines 1, 1a, . . . are for the spatial light modulator, and similarly to this, the vertical signal lines 26, 26a, . . . for the light sensing device are provided for each row. Further, the horizontal read lines 27, 27a, . . . horizontal reset lines 28, 28a, . . . , and horizontal selection lines 29, 29a, . . . are provided for the light sensing device for each column.

For the spatial light modulator, each pixel is provided with pixel switches 3, 3a, . . . comprising switching transistors, interference structure portions (or liquid crystal portions) 4, 4a, . . . , and retention capacities 5, 5a, . . . . Further, for the spatial light modulator, each pixel is provided with photodiodes 21, 21a, . . . , transfer switches 22, 22a, . . . comprising transistors, reset switches 23, 23a, . . . comprising transistors, amplifier transistors 24, 24a, . . . , and selection switches 25, 25a, . . . comprising transistors. When the spatial light modulator comprises the reflection type light interference modulator, the interference structure portion is used, and when it comprises the reflection type liquid crystal on silicon, the liquid crystal portion is used.

In the spatial light modulator portion of each pixel, gates of the pixel switches 3, 3*a*, . . . are connected to the corresponding drive lines 2, 2*a*, . . . , and drains are connected to the corresponding vertical signal lines 1, 1*a*, . . . . The retention capacities 5, 5*a*, . . . are provided between the source of the pixel switch and the constant potential point (for example, an earth potential point). Further, the interference structure portions (or liquid crystal portions) 4, 4*a*, . . . are also connected to the source of the pixel switch. Each interference structure portion (or the liquid crystal portion) also comprises a common counter electrode 6 common for each pixel. One end of each of the vertical signal lines 1, 1*a*, . . . is connected to the horizontal signal line 10 for the spatial light modulator through the sampling switches 9, 9*a*, . . . , and the gates of the sampling switches 9, 9*a*, . . . are connected to horizontal shift register 8 of the spatial light modulator. Further, one end of each of the drive lines 2, 2*a*, . . . is connected to vertical shift register 7.

In the light sensing device portion of each pixel, anodes of the photodiodes 21, 21*a*, . . . are earthed, and each of cathodes are connected to one end of the transfer switches 22, 22*a*, . . . , respectively. The gates of the transfer switches 22, 22*a*, . . . are connected to the corresponding horizontal read lines, and the other end each is connected to one end each of the reset switches 23, 23*a*, . . . are for resetting the photodiodes and floating diffusion (FD) areas electrically connected with the photodiodes to a predetermined potential, and the other ends are applied with a predetermined potential and the gates are connected to the horizontal reset lines. Further, the other ends of the transfer switches 22, 22*a*, . . . are also connected to the gates of the amplifier transistors 24, 24*a*, . . . for amplifying the signal charges by the photodiodes 21, 21*a*, . . . . One end each of the amplifier transistors 24, 24*a*, . . . is applied with the predetermined potential, and each of the other end is connected to the corresponding vertical signal line of the light sensing device through the selection switches 25, 25*a*, . . . . The gate of the selection switch is connected to the corresponding horizontal selection line. One end each of the vertical signal lines 26, 26*a*, . . . of the light sensing device is connected to the horizontal signal line 33 of the light sensing device through the sampling switches 32, 32*a*, . . . . The gates of the sampling switches 32, 32*a*, . . . are connected to the horizontal shift registers 31 of the light sensing device. Each one end of the horizontal read lines 27, 27*a*, . . . , the horizontal reset lines 28, 28*a*, . . . , and the horizontal selection lines 29, 29*a*, . . . for the light sensing device is connected to the vertical shift register 30 of the light sensing device, respectively.

In FIG. 16, while the pixels are arranged in two rows and two columns, as a matter of course, the circuit of the modulator/light sensing device 108 (108') in the optical information recording and reproducing apparatus of the present embodiment can be, for example, made into a matrix configuration of multi-pixels such as 1,000 rows and 1,000 columns.

The circuit operation of the modulator/light sensing device 108 of the present embodiment will be described. First, a write mode will be described. The operation of the write time is the same operation as the active matrix operation in the general display device, and the like.

First, an ON signal is inputted to the drive line 2 from the vertical shift registers 7, and pixel switches 3 and 3*a* are put into an ON state. In this state, the horizontal shift registers 8 are operated in order and a signal is transmitted to the vertical signal line 1 from the horizontal signal line 10. That is, first, the sampling switch 9 is turned on, and the signal of the horizontal signal line 10 is written in the vertical signal line 1, and the retention capacity 5 is accumulated with the charge according to the signal through the pixel switch 3. When the reflection type light interference modulator is used as the SLM, the potential difference between the reflection electrode (not shown) of the interference structure portion 4 and the common counter electrode 6 is applied to this modulator, and an electrical field is generated therebetween. By this electrical field, the interference structure portion 4 is changed, and specifically, the distance between the reflection electrode and the common counter electrode 6 is changed, and the reflectance for the incident beam can be changed to a desired value. Here, if the reflection type liquid crystal on silicon is used as the SLM, one electrode of the liquid crystal pixel is connected to the pixel switch, and the other electrode is made into the common counter electrode 6, so that the electrical field is generated in the liquid crystal portion, and by this electrical field, the orientation of the liquid crystal is changed, thereby changing the polarization characteristics of the incident beam. By the combination of the polarization plate, the wave length plate, and the like, the reflectance is changed to the desired value. As the SLM in the holographic memory system, since two gradations of white and black may be enough, the voltage in which the maximum reflectance or the minimum reflectance can be obtained as the reflectance is given to the interference structure portion 4 or the liquid crystal portion.

After having written one line all, the drive line 2 is turned off, and this time, signals are inputted to the drive line 2*a* in order to put pixel switches 3*b* and 3*c* into an on state. After that, similarly as described above, the signals are written into the pixels in order in the horizontal direction. After the voltage is written in all the line, this operation is repeated from the first line again, and the voltage of each pixel is re-written. In this manner, the signals are written in all the pixels, and after that, if the light from the first light source 101 is allowed to enter the modulator/light sensing device 108, it is reflected in each pixel as a modulated light, and this reflected light interferences with the reference beam 109, and is recorded in the recording medium 118.

In the modulator/light sensing device 108, the pixel that modulates the reference beam 109, that is, the pixel located in the reference beam area is set so as to have a constant reflectance. For example, the pixel is made into the same configuration as the pixel hit by the information beam and given a voltage such that the maximum reflectance is obtained. Needless to mention, since the shift correction is performed as described above, the pixel modulating the reference beam 9 is not always the same.

Next, a read mode will be described.

The information recorded on the recording medium 118 is reproduced by the reference beam 109, and a beam intensity equivalents to [1 (white)] or [0 (black)] enters the light sensing device, and an amount of charge corresponding to that beam intensity is accumulated in the photodiodes 21, 21*a*, . . . . An ON signal is outputted to the horizontal read line 27 from the vertical shift register 30 and the transfer switch 22 is turned on, so that the charge accumulated in the photodiode changes the potential of the gate of the amplifier transistor 24. As a result, the voltage corresponding to the signals accumulated in the photodiode is outputted to the drain of the amplifier transistor 24. When the selection switch 25 is put into an on state by the horizontal selection line 29 from the vertical shift register 30, the output of the amplifier transistor 24 is transmitted to the vertical signal line 26. The horizontal shift transistor 31 is operated in order, and the sampling switch 32 is turned on, so that information is transmitted to a horizontal signal line 33 from the vertical signal line 26. After the sampling switch 32 is turned off, the sampling switch 32a of the next column is turned on, and the signal is transmitted in the same manner. After all the signals of one column are transmitted, the transmission proceeds to the next column by the vertical shift register 30, and in the same manner, the signal is read in order. After that, based on the read signal, the signals recorded on the recording medium 118 are only to be read.

Incidentally, when the SLM using the reflection type light interference light modulator and the CMOS sensor, which is the light sensing device, are laminated and integrated on a silicon substrate, the light sensing device is also positioned at the bottom of the above-described semi-transparent film of the interference structure portion. Consequently, immediately before the read mode is performed, it is necessary that the transistors 3, 3a, 3b, . . . of the SLM of all the pixels receiving information are turned on once, and the interference structure portions 4, 4a, 4b, . . . are kept in a state showing the same level of transmittance.

Incidentally, the circuit diagram shown in FIG. 4 can be commonly adapted not only to the case in which the spatial light modulator and the light sensing device are laminated and integrated in the vertical direction, but also, to the case in which the spatial light modulator and the light sensing device are abutted on each other without being superposed for each pixel.

Figure 17:
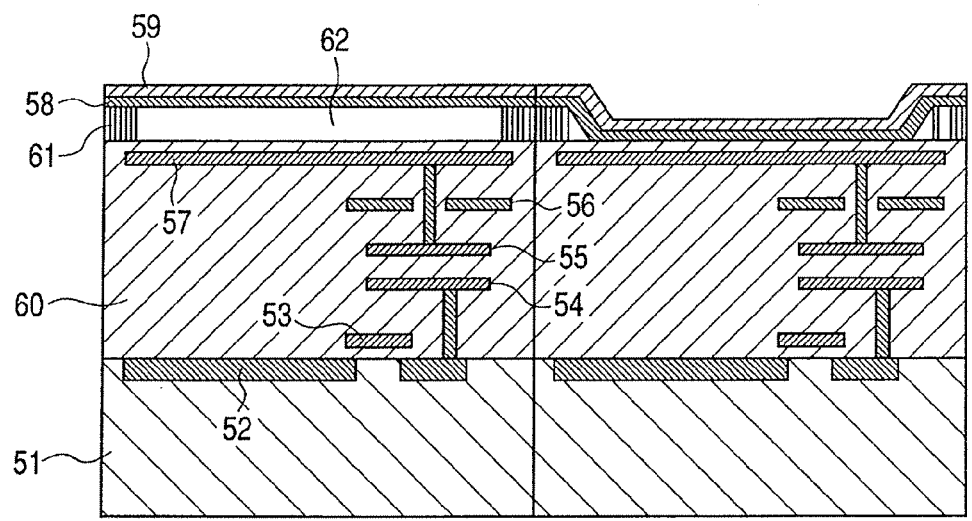
FIG. 17 is a cross-sectional view showing the modulator/light sensing device configured by laminating the spatial light modulator and the light sensing device using a reflection type light interference modulator in a longitudinal arrangement.

Next, the structure of the modulator/light sensing device, in which the SLM using the reflection type light interference light modulator in the present embodiment and the CMOS sensor, which is the light sensing device, are vertically integrated, that is, laminated, will be described. FIG. 17 shows a cross section structure of the main components of such a modulator/light sensing device. Here, the area for two pixel portions is shown, and described is an example using the CMOS sensor capable of reading at a high speed as the light sensing device. The type of the light sensing device is not particularly limited, and a CCD and other optical sensors may be used. Incidentally, since an optical image pattern may be detected in the area only of the information beam at the reproducing time, the light sensing device may be formed in the information beam area only in the SLM.

The surface of a single crystal silicon (Si) substrate 51 is formed with a photodiode 52 and is also provided with a gate electrode 53 of the transfer switch of the CMOS sensor. To cover the entire surface of the substrate, an interlayer insulation film 60 is provided, and inside this interlay insulation film 60, a wiring 54 of the CMOS sensor, a wiring of the SLM, and a light shielding film 56 are provided. The light shielding film 56 is for the purpose of the incident beam not to reach the lower transistor area. Close to the most upper surface of the interlayer insulation film 60, a reflection electrode 57 is provided. The wiring 54 is connected to the source/drain electrode of the transfer switch through a contact hole, and the wiring 55 is connected to the reflection electrode 57 through the contact hole. At a position, which is the surface of the interlayer insulation film 60 and equivalent to the peripheral edge portion of the reflection electrode 57, a columnar insulation film 61 is provided, and, as if being supported by this insulation film 61, a semi-transparent film 58 is provided. Between the semi-transparent film 58 and the reflection electrode 57, a space (air gap) 62 is provided. Within the surface of the semi-transparent film 58, the entire surface of the surface, which does not face with the air 62, is formed with a protection film 59. In this figure, a LOCOS oxide film for interpixel insulation, and the like, other transistors and wirings of the CMOS sensor, and the pixel switches and wirings of the SLM are omitted.

In this modulator/light sensing device, interference is allowed to be generated for the incident beam between the reflection electrode (first interference mirror) 57 and the semi-transparent film (second interference mirror) 58, and the distance of a space (for example, air) 62 therebetween is changed, so that reflectance and transmittance are changed. In this configuration, the SLM using the reflection type light interference light modulator and the CMOS sensor, which is the light sensing device, are vertically integrated. Hence, when the light entering the CMOS sensor, which is the light sensing device, is read, a transmission mode is used, and therefore, both of the interference mirrors (that is, the semi-transparent film 68 and the reflection electrode 57) are required to be semi-transparent. However, in the case of a horizontal arrangement, since there is no need to use the transmission mode in the interference structure portion 4, the reflection electrode 57 need not be semi-transparent. When the reflection electrode 57 is not semi-transparent, it is preferable to use a material having a high reflectance as the reflection electrode 57, and, for example, a metal film, such as Al, AlSi, AlCu, Ti, Ta, W, Ag, Pt, Ru, Ni, Au, TiN, or a compound film of these metals, can be used. However, the materials of the reflection electrode are not limited to those shown here. The columnar insulation film 61, arranged between the reflection electrode 57 and the semi-transparent film 58, for example, is formed by a silicon nitride film, and the protection film 59 of the semi-transparent film 58, for example, is formed by a silicon oxide film. Incidentally, the columnar insulation film 61, the interlayer insulation film 60, and the protection film 59, can be used without any particular limitation, provided that they are electrically insulated materials, and moreover, they may be configured by different materials or the same materials.

Next, the operation of this modulator/light sensing device as the interference structure portion will be described. First, the semi-transparent film 58 composed of Ti, for example, is given a grand potential of 0V. By the above-described active matrix operation, the reflection electrode 57 is given a voltage corresponding to the signal, and a potential difference is generated between the reflection electrode 57 and the semi-transparent film 58, and by a Coulomb force generated by this potential difference, the air gap is changed. Assuming that the light is incident on the illustrated upper side, a certain ratio portion of this incident beam is reflected by the surface of the semi-transparent film 58, and the remaining portion transmits the semi-transparent film 58, to be reflected by the reflection electrode 57, and transmits the semi-transparent film 58, to be outputted outside. At this time, the component reflected on the surface of the semi-transparent film 58 and the component reflected by the reflection electrode 57 interfere with each other, and the intensity of the reflection light, as a whole, is changed according to the potential difference between both of the components. The potential difference is decided by an optical path difference, and the optical path difference is two times the size of the air gap, and therefore, by changing the air group according to the signal voltage, the intensity of the reflection light (reflection light as a whole), as the interference structure portion, can be controlled.

Figure 18:
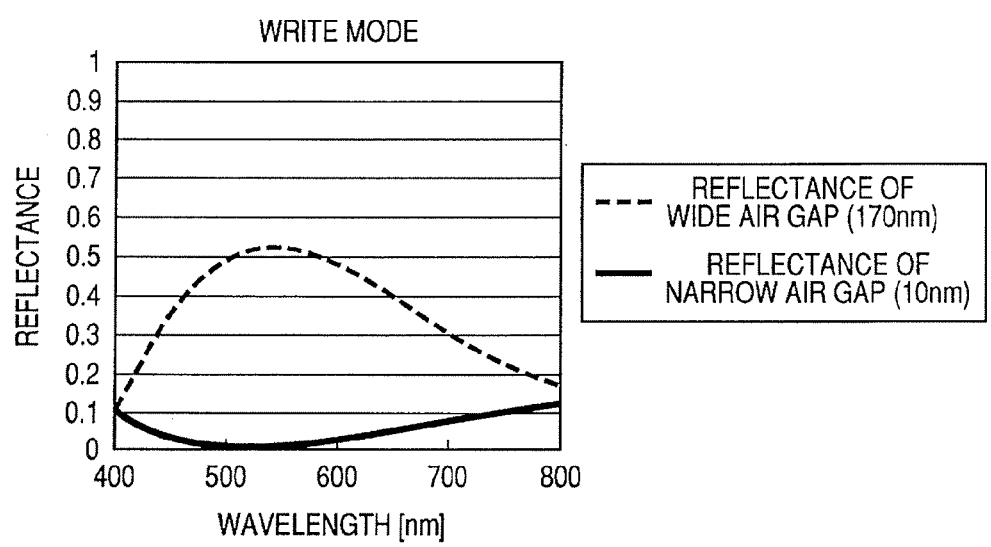
FIG. 18 is a graph showing a wavelength-reflectance characteristic of the modulator/light sensing device shown in FIG. 17.

FIG. 18 is a graph representing a wavelength change of the reflectance at the time of 170 nm and 10 nm in an air gap, when the interference structure is provided, is configured in such a manner. Here, as the protection film 59, $SiO_2$ of 10 nm in thickness is used, and as the semi-transparent film 58, Ti of 5 nm in thickness, $Si_3N_4$ of 20 nm in thickness laminated in this order are used, and as the reflection electrode 57, Ti of 15 nm in thickness having $SiO_2$ film of 10 nm in thickness on the surface is used. As shown in FIG. 18, in the light of 550 nm in wavelength, the reflectance at the time of 170 nm in air gap is 52.5% and the reflectance at the time of 10 nm is 1.2%. When the air gap is changed from 10 nm to 170 nm by the voltage of the signal given to the reflection electrode 57, it is clear that the reflectance is sharply changed accompanied with that change. The interference action is designable depending on the wavelength, the semi-transparent film material, and the air gap, respectively. Consequently, it is important for the interference structure portion to have a necessary structure in view of the characteristics such as physical strength, a contrast ratio, and the like.

Figure 19:
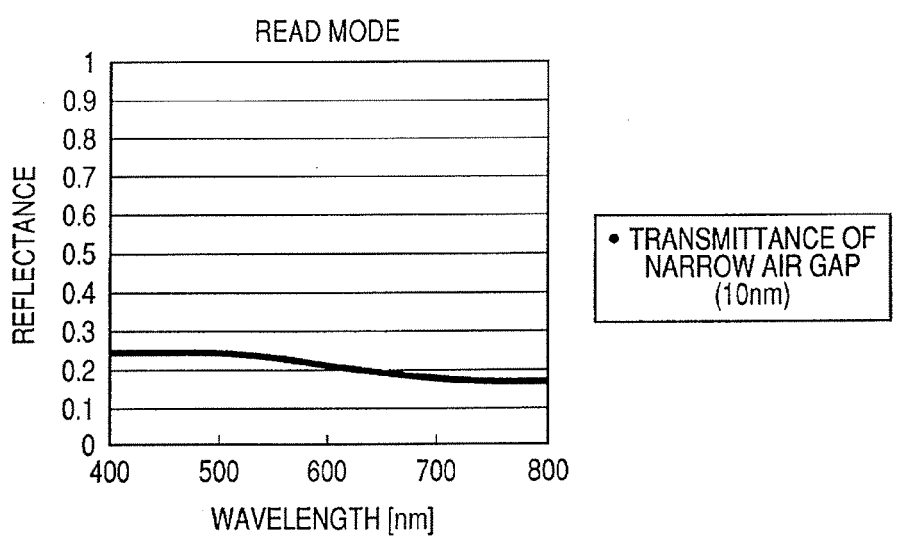
FIG. 19 is a graph showing a wavelength-transmittance characteristic of the modulator/light sensing device shown in FIG. 17.

In the case of the read mode, in the pixel where at least the information beam enters, it is necessary that the transmittance is kept constant with the state of the light interference kept in the same state. Hence, FIG. 19 shows a wavelength change for the transmittance in the case in which the air gap is taken as 100 nm, in this modulator/light sensing device. In this case, though the transmittance is 23.0% and is relatively low, it is important that it is constant, and the absolute value of the transmittance is not so important. By keeping the transmittance constant, it is possible to discriminate the intensity of the reproduced beam by the CMOS sensor, and to identify whether it is a white pixel or a black pixel.

Next, the fabricating method of the modulator/light sensing device, in which the spatial light modulator (SLM) composed of such a reflection type light interference modulator and the light sensing device, which is the CMOS sensor, are integrated, will be described.

By using a silicon (Si) semiconductor substrate, a CMOS sensor is formed on this semiconductor substrate by a known method. As a specific forming method, any arbitrary method can be used. At the same time, any arbitrary method can be used. At the same time, a write transistor (pixel switches 3, 3a, . . . in FIG. 4) of the SLM is formed by an nMOS transistor. After that, an interlayer insulation film is formed, and each wiring is formed, and moreover, a reflection type light interference modulator is formed. One example of a specific fabricating procedure is as follows.

The n-type single crystal silicon semiconductor substrate is thermally oxidized locally, thereby forming a LOCOS (Local Oxidation of silicon) oxidized film. Then, with the LOCOS oxidized film as a mask, ions are implanted with a dose amount of approximately $10^{11}$ $cm^2$ of Boron (B), thereby forming a p type well, which a p type impurity area. This substrate is thermally oxidized again, thereby forming a gate oxidized film of 60 nm in thickness.

Next, a gate electrode 53 composed of an n type poly silicon with phosphorus (P) doped approximately at $10^{20}$ $cm^3$ is formed, and after that, the entire surface of the substrate is ion implanted with a dose amount of approximately $10^{13}$ $cm^2$ of phosphorus, thereby forming an n type decreased level drain, which is an n type impurity area of approximately $10^{18}$ $cm^3$ of the impurity concentration. Subsequently, with a patterned photo register as a mask, phosphorus is ion implanted with a dose amount of approximately at $10^{15}$ $cm^2$, thereby forming a source/drain area of the impurity concentration approximately at $10^{20}$ $cm^3$ and forming an pMOS transistor. Similarly, a pMOS transistor is formed.

The CMOS sensor is fabricated by a known technique. The transistor configured by the CMOS sensor can be formed at the same time with the forming process of the above-described transistor, and moreover, the process of the photo diode only may be added.

After that, the interlayer insulation film 60 is formed at the entire surface of the substrate. For the interlayer insulation film a PSG (Phospho-Silicate Glass) film, an NSG (Nondope Silicate Glass)/BPSG (Boro-Phospho-Silicate Glass) film or a CVD (chemical vapor growth) film, and the like, by TEOS (Tetra ethoxy silane) can be used, and is not particularly limited.

Next, a contact hole is patterned directly above the source/drain area, and an aluminum (Al) layer is deposited by spattering, and the like, and is patterned, thereby forming a wiring 54 of the backing. To improve ohmic contact characteristics with this lower wiring layer 334 and the source/drain area, it is desirable to form a barrier metal, such as Ti/TiN, and the like, between the wiring 54 and the source/drain area. After that, the interlayer insulation film is formed, and moreover, by the metallic film, the light shielding film 56 is formed. For the light shielding film 56, for example, a metal film such as Ti, TiN, Al, Ag or a laminated film of those metals can be used, and are not particularly limited.

After that, Ti is laminated approximately 15 nm in thickness by the sputtering method, and the like, and is patterned, thereby forming the reflection electrode 57. Then, as a protection film of the reflecting electrode 57, a silicon oxide film of 15 nm in thickness is provided by a CVD method.

Next, a silicon nitride film is formed by a plasma CVD method, and a columnar insulation film 61 is formed by etching after patterning. After that, it is coated with a resist and flattened, and after that, it is flattened, so that the columnar insulation film 61 of approximately 180 nm in height remains uniformly. Next, by a sputtering method of low temperatures, $Si_3N_4$: thickness of 20 nm, $SiO_2$: thickness of 10 nm, $Si_3N_4$: thickness of 20 nm, and Ti: thickness of 5 nm are formed in order, and moreover, a silicon oxide film which becomes a protection film 59 is laminated 10 nm in thickness. After patterning, a silicon nitride film, a silicon oxide film and a Ti layer are etched by dry or wet etching, and after that, the resist is removed by the wet etching. By this process, a semi-transparent film 58 and a protection film 59 are formed. After that, the electrode is extracted by wire bonding, thereby finishing the reflection type light interference modulator.

Here, while an example of shifting a start position of the shift register has been shown in the present embodiment, the present invention is not limited to this. Although the display position is similarly shifted to the SLM, a start position of the shift register is not shifted, but the display position of [1 (white)] may be shifted. That is, though the entire effective pixel shows [1 (white)] or [0 (black)], by simply shifting the display position of [1 (white)], the entire pattern is displayed in a shifted manner, and becomes the same as a pattern displayed by shifting the start position of the shift register.

Second Embodiment

Figure 20:
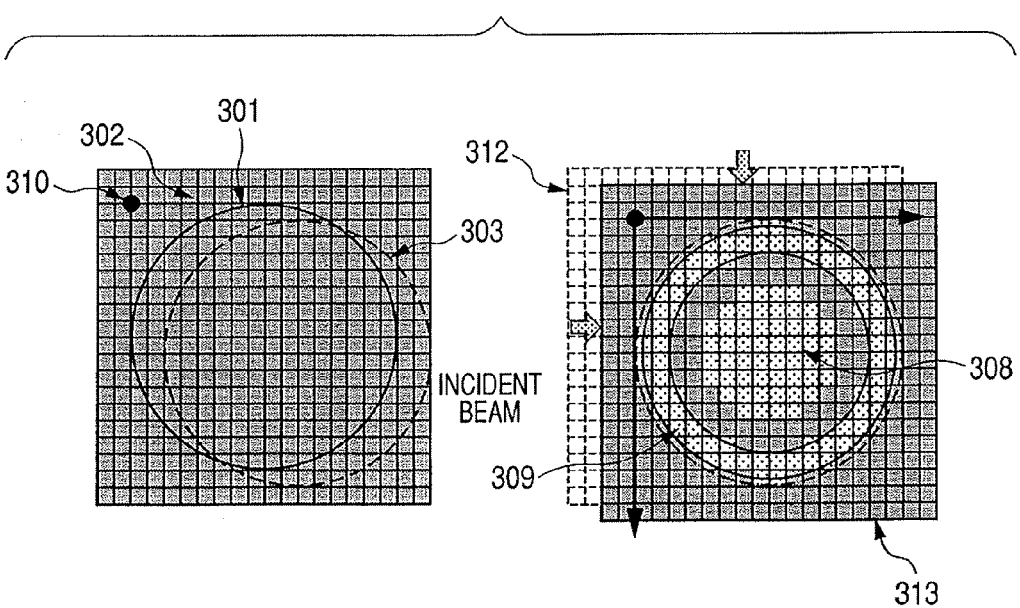
FIG. 20 is a view for explaining the shift correction in a second embodiment of the present invention.

In the present invention, as a correction method of the shift of an incident beam to a spatial light modulator, as described above, there is a method of physically moving the spatial light modulator itself according to the shift amount in addition to the method of changing a start position of the shift register, and electrically correcting a display position at the spatial light modulator. FIG. 20 is a view explaining a shift correction by physical movement.

In FIG. 20, in the surface of the spatial light modulator, an actual incident beam 303 is shifted from a designed incident beam 301. Directly below the spatial light modulator, a light sensing device area of a CMOS sensor is provided, and each light receiving pixel shall be shown by reference numeral 302. Further, a point that serves as a reference for the operations of a horizontal shift register and a vertical shift register is an original 310. In the present embodiment, for such a shift, as shown in FIG. 20, the shift of the actual incident beam 303 from the designed incident beam 301 is corrected by shifting the physical position of the spatial light modulator. In FIG. 20B, an outline 312 shown by a broken line shows the initial position of the spatial light modulator, and an outline 313 shown by a solid line is a position of the spatial light modulator after correcting the position in an XY direction. As described above, the spatial light modulator is mounted on a precision XY stage, and by adjusting the positions in the X direction and the Y direction of the XY stage according to the detected shift amount, that is, by feeding back the detected shift amount to the XY stage, a correction can be made, so that the incident beam is irradiated on the display position of an original modulation signal as the spatial light modulator.

Third Embodiment

Figure 21:
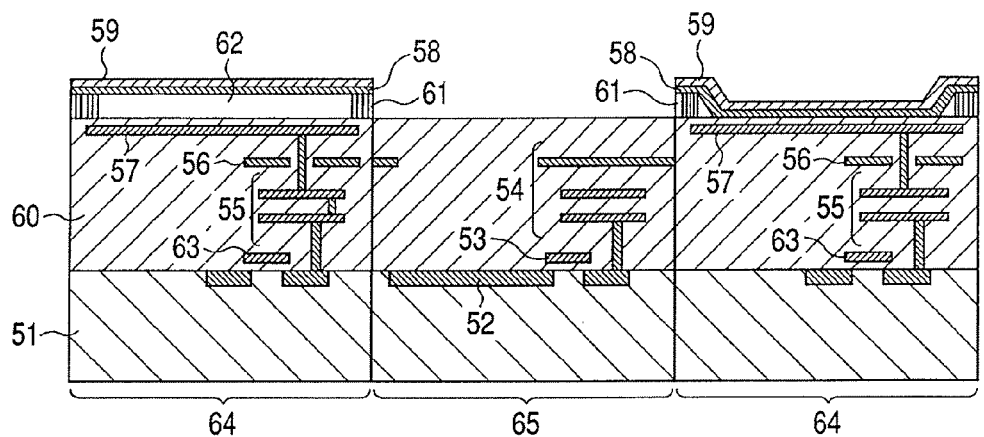
FIG. 21 is a cross-sectional view showing the modulator/light sensing device configured by arranging the spatial light modulator and the light sensing device using the reflection type light interference modulator in a horizontal arrangement.

In the above-described first embodiment, while the modulator/light sensing device 108 has been configured by laminating the spatial light modulator (SLM) an the light sensing device (CMOS sensor) on the surface of the silicon semiconductor substrate in a vertical direction, the modulator/light sensing device used in the present invention is not limited to this. In the modulator/light sensing device 108, the spatial light modulator and the light sensing device may be arranged in a horizontal posture for each pixel. FIG. 21 shows the modulator/light sensing device 108 in which the SLM and the light sensing device are arranged in such a horizontal posture.

The modulator/light sensing device 108 shown in FIG. 8 comprises an SLM element area 64 having the SLM composed of a reflection type light interference modulator and a CMOS sensor area 65 having a CMOS light sensing device for each pixel. The SLM element area 64 and the CMOS sensor area 65 for each pixel are provided in the same silicon substrate 51, and are arranged mutually adjacent.

The fabricating process of the modulator/light sensing device, as shown in FIG. 8, is basically the same as the fabricating process of the modulator/light sensing device arranged in a vertical posture shown in the first embodiment. That is, while the SLM element area 64 is not provided with a photodiode, but it is formed with an interference structure composed of a reflection electrode 57 and a semi-transparent film 58. On the other hand, the CMOS sensor area 65 is not formed with the interference structure, but it is formed with a photodiode 52. Although not shown, in this structure. when a micro lens is arranged on the CMOS sensor area 65, an effective open ratio is increased.

In the case of such a modulator/light sensing device arranged in such a horizontal posture, in the reflection type light interference modulator configuring the SLM, there is no need for a transmission mode for guiding the light to the light sensing device, and therefore, it is possible to use a relatively thick film composed of aluminum (Al), and the like, as the reflection electrode 57.

Figure 22:
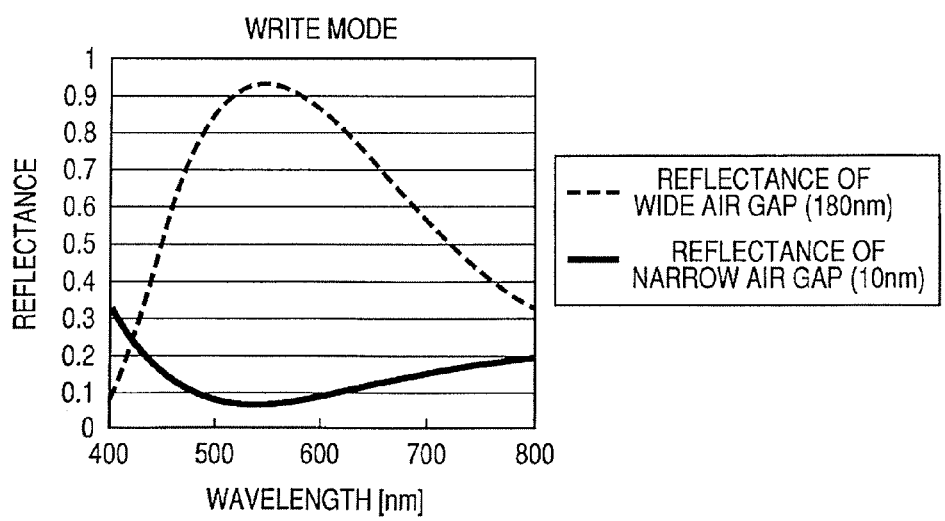
FIG. 22 is a graph showing a wavelength-reflectance characteristic of the modulator/light sensing device shown in FIG. 21.

FIG. 22 is a graph representing the wavelength change of reflectance at the time of 180 nm and 10 nm in the air gap when the interference structure portion is configured in this manner. Here, as the protection film 59, $SiO_2$ of 10 nm in thickness is used, and as the semi-transparent film 58, Ti of 5 nm in thickness, $Si_3N_4$ of 20 nm in thickness, $SiO_2$ of 10 nm in thickness, and $Si_3N_4$ of 20 nm in thickness laminated in this order were used, and as the reflection electrode 57, AlSi of 15 nm in thickness having an $SiO_2$ film of 10 nm in thickness on the surface was used. As shown in FIG. 6, in the light having a wavelength of 550 nm, the reflectance at the time of 180 nm in the air gap is 93.0%, and the reflectance at the time of 10 nm is 0.6%. By the voltage of the signal given to the reflectance electrode 57, when the air gap is changed from 10 nm to 180 nm, it is clear that the reflectance is sharply changed, accompanied with this change. This interference action is designable depending on the wavelength, the semi-transparent film material, and the air gap, respectively, and consequently, it is important for the interference structure portion to have a necessary structure in view of the characteristics such as physical strength, a contrast ratio, and the like.

Figure 23:
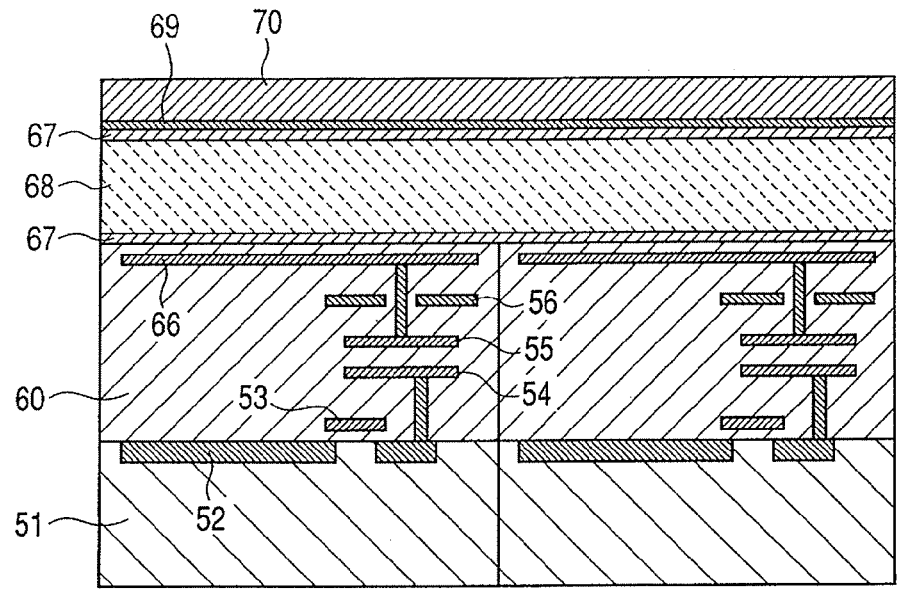
FIG. 23 is a cross-sectional view showing the modulator/light sensing device configured by laminating the spatial light modulator and the light sensing device using a reflection type liquid crystal on silicon in a longitudinal arrangement.

Further, in the present invention, as the spatial light modulator configuring the modulator/light sensing device, a reflection type liquid crystal on silicon (LCOS) can be used. The modulator shown in FIG. 23 uses the LCOS as the spatial light modulator, and arranges the reflection type liquid crystal on silicon (LCOS) and the CMOS (sensor) in a vertical posture in the modulator/light sensing device.

The surface of a silicon substrate 51 is provided with a photodiode 52 and a gate electrode 53 of a transfer switch, and at the same time, an interlayer insulation film 60 is provided on its top. Wirings 54 and 55, and a light shielding film 56 being provided in the interlayer insulating film 60, is the same as the modulator/light sensing device shown in FIG. 5. In the modulator/light sensing device shown in FIG. 10, close to the surface of the interlayer insulation film 60, a pixel electrode 66 for each pixel is provided. Opposing the interlayer insulation film 60, a glass plate 70 is arranged, and between the interlayer insulation film 60 and the glass plate 70, a liquid crystal 68 is sealed. The surface of the liquid crystal 68 side of the glass plate 70 is formed with an ITO (indium/tin oxide) film 69, which becomes a common electrode, and the surface of the ITO film 69 and the surface of the interlayer insulation film 60 are formed with an orientation film 67. Here, as the liquid crystal 68, a vertical liquid crystal is used, and as the orientation film 67, a rhomble deposition $SiO_2$ film is used. A pixel electrode 66 is, for example, provided as a semi-transparent film having a reflectance of 50%. Incidentally, in this modulator/light sensing device, a composition and a thickness of the liquid crystal 68 are designed such that when an incident beam (wavelength: A) passes through the liquid crystal 68, and is reflected by the pixel electrode 66, and passes through the liquid crystal 68 again, a phase shift of $\lambda/2$ is generated.

In such a modulator/light sensing device, in the case of the [1] display, the voltage is applied between the pixel electrode 66 and the common electrode 69, and an electrical field is applied to the liquid crystal 68, so that a liquid crystal molecule falls down. On the other hand, in the case of the [0] display, the electrical field is not applied, so that the liquid crystal molecule vertically stands up. If such a reflection type liquid crystal on silicon is used as the spatial light modulator, in the optical system shown in the first embodiment, when the light turned into a linear polarized light of an S polarization by the PBS (polarized beam splitter) 104, before entering, is allowed to enter the modulator/light sensing device 108, the polarized direction is not changed, but the light is reflected by the pixel electrode with an intensity of 50% in the case of the [0] display. In this case, though the reflected light enters the PBS 104 again, since the polarization is not changed, it is reflected by the PBS 104, and the light does not reach the recording medium (hologram) 118. On the other hand, in the case of the [1] display, though a reflectance by the pixel electrode 66 is 50%, since the composition and thickness of the liquid crystal are set as described above, the reflected light beam becomes a linear polarized light with a plane of polarization rotated 90°. Consequently, this reflected light enters and transmits the PBS 104 by P polarization, and is oriented to the recording medium 118. Although the intensity of the light becomes 50% even in the case of [1], it is still of sufficient strength to discriminate [1] and [0].

When reading the information recorded in the recording medium 118, since the liquid crystal 68 may only allow the reproduced beam to transmit in the information light area, a polarized state of the liquid crystal 68 may be in any state, and it does not matter if the liquid crystal 68 is in whatever state.

Figure 24:
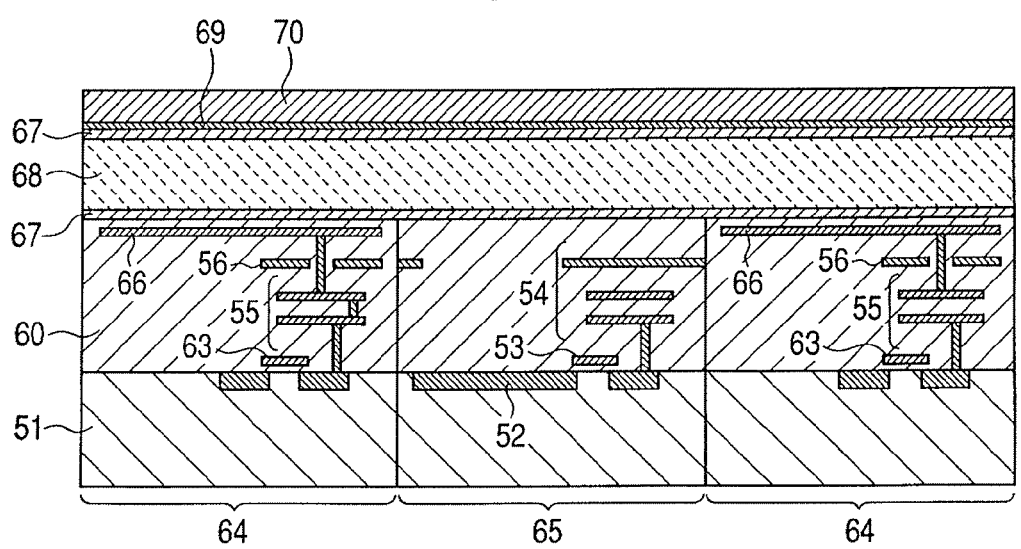
FIG. 24 is a cross-sectional view showing the modulator/light sensing device configured by arranging the spatial light modulator and the light sensing device using the reflection type liquid crystal on silicon in a horizontal direction.

In the present invention, similar to the case of the reflection type light interference modulator, even when the reflection type liquid crystal on silicon (LCOS) is used as the spatial light modulator in the modulator/light sensing device, the spatial light modulator and the light sensing device for each pixel can be arranged in a horizontal posture on the silicon substrate. FIG. 24 shows the modulator/light sensing device arranged in such a horizontal posture.

The modulator/light sensing device shown in FIG. 24 comprises the SLM element area 64 having the SLM composed of the reflection type liquid crystal on silicon and the CMOS sensor area 65 having the CMOS light sensing device for each pixel. The SLM element area 64 and the CMOS sensor area 65 for each pixel are provided on the same silicon substrate 51 and are arranged mutually adjacent. The operation as the spatial light modulator of this modulator/light sensing device is the same as the case of the above-described arrangement in the vertical posture, in the case of recording the information and in the case of reproducing the information.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical information recording and reproducing apparatus for recording information on a recording medium by forming interference fringes generated by interference between an information beam and a reference beam on the recording medium, and reproducing the information by irradiating the recording medium with the reference beam, in which the interference fringes are formed, said apparatus comprising:
   a spatial light modulator for spatially modulating at least a portion of a light beam emitted from a light source into the information beam;
   a light sensing device that reads the information beam extracted from the recording medium by the reference beam irradiated on the recording medium;
   a shift amount detector that detects a shift of an irradiating position of the light beam entering said spatial light modulator; and
   a correction device that corrects a positional shift between a position of an area for modulating the information beam and a position of the light beam in said spatial light modulator, based on a positional shift amount detected by said shift amount detector,
   wherein said spatial light modulator comprises a plurality of pixels, and is configured such that effective pixels are allowed to function as pixels for the reference beam and pixels for the information beam, and the area of the effective pixels of said spatial light modulator is divided into the area for the reference beam and the area for the information beam, according to a position based on the detected positional shift amount.

2. The optical information recording and reproducing apparatus according to claim 1, further comprising a shift register for writing a signal for each pixel in the effective pixel area, such that the positional shift is corrected by correcting a start position in said shift register.

3. An optical information recording and reproducing apparatus for recording information on a recording medium by forming interference fringes generated by interference between an information beam and a reference beam on the recording medium, and reproducing the information by irradiating the recording medium with the reference beam, in which the interference fringes are formed, said apparatus comprising:
   a spatial light modulator for spatially modulating at least a portion of a light beam emitted from a light source into the information beam;
   a light sensing device that reads the information beam extracted from the recording medium by the reference beam irradiated on the recording medium;
   a shift amount detector that detects a shift of the irradiating position of the light beam entering said spatial light modulator; and
   a correction device that corrects a positional shift between a position of an area for modulating the information beam and a position of the light beam in said spatial light modulator, based on a positional shift amount detected by said shift amount detector,
   wherein said spatial light modulator and said light sensing device are integrally formed on the same substrate, and said spatial light modulator and said light sensing device are laminated so that said spatial light modulator is arranged at the light source side, and a pixel pitch in said spatial light modulator and a pixel pitch in said light sensing device match, so that the pixel in said spatial light modulator and the pixel corresponding to said light sensing device are arranged along an optical axis of the light incident from the light source, and at least a portion of the light incident on said spatial light modulator transmits toward said light sensing device.

4. An optical information recording and reproducing apparatus for recording information on a recording medium by forming interference fringes generated by interference between an information beam and a reference beam on the recording medium, and reproducing the information by irradiating the recording medium with the reference beam, in which the interference fringes are formed, said apparatus comprising:
   a spatial light modulator for spatially modulating at least a portion of a light beam emitted from a light source into the information beam;
   a light sensing device that reads the information beam extracted from the recording medium by the reference beam irradiated on the recording medium;
   a shift amount detector that detects a shift of the irradiating position of the light beam entering said spatial light modulator; and
   a correction device that corrects a positional shift between a position of an area for modulating the information beam and a position of the light beam in said spatial light modulator, based on a positional shift amount detected by said shift amount detector,
   wherein said spatial light modulator and said light sensing device are integrally formed on the same substrate, and said spatial light modulator and said light sensing device are arranged mutually adjacent, so that a pixel in said spatial light modulator and a corresponding pixel in said light sensing device are not superposed along the optical axis of the light incident from the light source.

5. An optical information recording and reproducing apparatus for recording information on a recording medium by forming interference fringes generated by interference between an information beam and a reference beam on the recording medium, and reproducing the information by irradiating the recording medium with the reference beam, in which the interference fringes are formed, said apparatus comprising:

a spatial light modulator for spatially modulating at least a portion of a light beam emitted from a light source into the information beam;

a light sensing device that reads the information beam extracted from the recording medium by the reference beam irradiated on the recording medium;

a shift amount detector that detects a shift of the irradiating position of the light beam entering said spatial shift modulator; and a correction device that corrects a positional shift between a position of an area for modulating the information beam and a position of the light beam in said spatial light modulator, based on a positional shift amount detected by said shift amount detector, wherein said spatial light modulator comprises a plurality of modulators changing in the intensity of the reflection light according to a modulation signal, and said spatial light modulator is a pixel comprising a reflection electrode reflecting the light from the light source and a semi-transparent film arranged at the light source side than the reflection electrode through an air gap, and a semi-transparent film showing a semi-transparency property for the light from the light source, wherein a reflectance of the light from the light source is changed by controlling a space between the reflection electrode and the semi-transparent film.

6. An optical information recording apparatus for recording information on a recording medium by forming interference fringes generated by interference between an information beam and a reference beam on the recording medium, said apparatus comprising:

a spatial light modulator for spatially modulating at least a portion of a light beam emitted from a light source into the information beam;

an optical system that allows the reference beam from the light source and the information beam from said spatial light modulator to interfere at a predetermined depth of the recording medium;

a shift amount detector that detects a shift of the irradiating position of a light beam entering said spatial light modulator; and a correction device that corrects a shift between a position of an area for modulating the information beam and a position of the light beam in said spatial light modulator, based on a positional shift amount detected by said shift amount detector, wherein said spatial light modulator comprises a plurality of pixels, and is configured such that effective pixels are allowed to function as pixels for the reference beam and pixels for the information beam, and the area of the effective pixels of said spatial light modulator is divided into the area for the reference beam and the area for the information beam, according to a position based on the detected positional shift amount.

7. The optical information recording and reproducing apparatus according to claim 6, further comprising:

a second optical system that introduces the reference beam into the predetermined depth of the recording medium, reproduces the information beam from the interference fringes, and extracts the reproduced information beam; and a third optical system that guides the extracted information beam to the light sensing device.

8. The optical information recording and reproducing apparatus according to claim 6, wherein said correction device corrects the detected positional shift amount by performing feedback.

9. The optical information recording and reproducing apparatus according to claim 6, further comprising a shift register for writing a signal for each pixel in the effective pixel area, such that the positional shift is corrected by correcting a start position in said shift register.

10. The optical information recording and reproducing apparatus according to claim 6, wherein said correction device comprises a device for mechanically moving a position of said spatial light modulator relative to the light beam.

11. The optical information recording and reproducing apparatus according to claim 6, wherein said modulator is a reflection type liquid crystal on silicon.

12. An optical information recording apparatus for recording information on a recording medium by forming interference fringes generated by interference between an information beam and a reference beam on the recording medium, said apparatus comprising:

a spatial light modulator for spatially modulating at least a portion of a light beam emitted from a light source into the information beam;

a light sensing device that reads the information beam extracted from the recording medium by the reference beam irradiated on the recording medium;

an optical system that allows the reference beam from the light source and the information beam from said spatial light modulator to interfere at a predetermined depth of the recording medium;

a shift amount detector that detects a shift of the irradiating position of the light beam entering said spatial light modulator; and a correction device that corrects a shift between a position of an area for modulating the information beam and a position of the light beam in said spatial light modulator, based on a positional shift amount detected by said shift amount detector, wherein said spatial light modulator and said light sensing device are integrally formed on the same substrate, and said spatial light modulator and said light sensing device are laminated so that said spatial light modulator is arranged at the light source side, and a pixel pitch in said spatial light modulator and a pixel pitch in said light sensing device match, so that the pixel in said spatial light modulator and the pixel corresponding to the light sensing device are arranged along an optical axis of the light incident from the light source, and at least a portion of the light incident on said spatial light modulator transmits toward the light sensing device.

13. The optical information recording and reproducing apparatus according to claim 12, further comprising:

a second optical system that introduces the reference beam into the predetermined depth of the recording medium, reproduces the information beam from the interference fringes, and extracts the reproduced information beam; and a third optical system that guides the extracted information beam to the light sensing device.

14. The optical information recording and reproducing apparatus according to claim 12, wherein said correction device corrects the detected positional shift amount by performing feedback.

15. The optical information recording and reproducing apparatus according to claims 12, wherein said correction device comprises a device for mechanically moving a position of said spatial light modulator relative to the light beam.

16. The optical information recording and reproducing apparatus according to claim 12, wherein said modulator is a reflection type liquid crystal on silicon.

17. An optical information recording apparatus for recording information on a recording medium by forming interference fringes generated by interference between an information beam and a reference beam on the recording medium, said apparatus comprising:
- a spatial light modulator for spatially modulating at least a portion of a light beam emitted from a light source into the information beam;
- a light sensing device that reads the information beam extracted from the recording medium by the reference beam irradiated on the recording medium;
- an optical system that allows the reference beam from the light source and the information beam from said spatial light modulator to interfere at a predetermined depth of the recording medium;
- a shift amount detector that detects a shift of an irradiating position of the light beam entering said spatial light modulator; and
- a correction device that corrects a shift between a position of an area for modulating the information beam and a position of the light beam in said spatial light modulator, based on a positional shift amount detected by said shift amount detector,
- wherein said spatial light modulator and said light sensing device are integrally formed on the same substrate, and said spatial light modulator and said light sensing device are arranged mutually adjacent, so that a pixel in said spatial light modulator and a corresponding pixel in said light sensing device are not superposed along the optical axis of the light incident from the light source.

18. The optical information recording and reproducing apparatus according to claim 17, further comprising:
- a second optical system that introduces the reference beam into the predetermined depth of the recording medium, reproduces the information beam from the interference fringes, and extracts the reproduced information beam; and
- a third optical system that guides the extracted information beam to the light sensing device.

19. The optical information recording and reproducing apparatus according to claim 17, wherein said correction device corrects the detected positional shift amount by performing feedback.

20. The optical information recording and reproducing apparatus according to claims 17, wherein said correction device comprises a device for mechanically moving a position of said spatial light modulator relative to the light beam.

21. The optical information recording and reproducing apparatus according to claim 17, wherein said light modulator is a reflection type liquid crystal on silicon.

22. An optical information recording apparatus for recording information on a recording medium by interference fringes generated by interference between an information beam and a reference beam on the recording medium, said apparatus comprising:
- a spatial light modulator for spatially modulating at least a portion of a light beam emitted from a light source into the information beam;
- an optical system that allows the reference beam from the light source and the information beam from said spatial light modulator to interfere at a predetermined depth of the recording medium;
- a shift amount detector that detects a shift of the irradiating position of a light beam entering said spatial light modulator; and
- a correction device that corrects a shift between a position of an area for modulating the information beam and a position of the light beam in said spatial light modulator, based on a positional shift amount detected by said shift amount detector,
- wherein said spatial light modulator comprises a plurality of modulators changing in the intensity of the reflection light according to a modulation signal, and
- said spatial light modulator is a pixel comprising a reflection electrode reflecting the light from the light source and a semi-transparent film arranged at the light source side than the reflection electrode through an air gap, and a semi-transparent film showing a semi-transparency property for the light from the light source, wherein a reflectance of the light from the light source is changed by controlling a space between the reflection electrode and the semi-transparent film.

23. The optical information recording and reproducing apparatus according to claim 22, further comprising:
- a second optical system that introduces the reference beam into the predetermined depth of the recording medium, reproduces the information beam from the interference fringes, and extracts the reproduced information beam; and
- a third optical system that guides the extracted information beam to the light sensing device.

24. The optical information recording and reproducing apparatus according to claim 22, wherein said correction device corrects the detected positional shift amount by performing feedback.

25. The optical information recording and reproducing apparatus according to claims 22, wherein said correction device comprises a device for mechanically moving a position of said spatial light modulator relative to the light beam.

26. The optical information recording and reproducing apparatus according to claim 22, wherein said spatial light modulator is a reflection type liquid crystal on silicon.

* * * * *